(12) United States Patent
Stevens et al.

(10) Patent No.: US 12,379,526 B2
(45) Date of Patent: Aug. 5, 2025

(54) RELATING TO VARIABLE FOCAL POWER OPTICAL ELEMENTS, A VARIABLE FOCAL POWER OPTICAL DEVICE, A DISPLAY MODULE FOR AN AUGMENTED REALITY HEADSET AND AN AUGMENTED REALITY HEADSET

(71) Applicant: ADLENS LIMITED, Eynsham (GB)

(72) Inventors: Robert Edward Stevens, Eynsham (GB); Simon Peter Horrocks, Eynsham (GB); Thomas Norman Llyn Jacoby, Eynsham (GB)

(73) Assignee: ADLENS LIMITED

( * ) Notice: Subject to any disclaimer, the term of this patent is extended or adjusted under 35 U.S.C. 154(b) by 739 days.

(21) Appl. No.: 16/963,007

(22) PCT Filed: Jan. 17, 2019

(86) PCT No.: PCT/GB2019/050131
§ 371 (c)(1),
(2) Date: Jul. 17, 2020

(87) PCT Pub. No.: WO2019/141990
PCT Pub. Date: Jul. 25, 2019

(65) Prior Publication Data
US 2020/0341172 A1     Oct. 29, 2020

(30) Foreign Application Priority Data

Jan. 19, 2018 (GB) ...................................... 1800933

(51) Int. Cl.
*G02B 3/14* (2006.01)
*G02B 27/01* (2006.01)
*G02C 7/08* (2006.01)

(52) U.S. Cl.
CPC ............... *G02B 3/14* (2013.01); *G02C 7/085* (2013.01); *G02B 2027/0178* (2013.01)

(58) Field of Classification Search
CPC .............. G02B 3/14; G02B 2027/0185; G02B 27/0081; G02B 27/0172; G02B 3/12; G02C 7/085

(Continued)

(56) References Cited

U.S. PATENT DOCUMENTS 4,834,512 A * 5/1989 Austin .................... G02B 30/54
359/666
5,684,637 A * 11/1997 Floyd ..................... G02C 7/085
359/666

(Continued)

FOREIGN PATENT DOCUMENTS

| CN | 105122091 A | 12/2015 |
|----|-------------|---------|
| EP | 2107397 A1  | 10/2009 |

(Continued)

OTHER PUBLICATIONS

Search Report for GB application No. 1800933.2 dated Jul. 20, 2018, 4 pages.

(Continued)

*Primary Examiner* — Zachary W Wilkes
(74) *Attorney, Agent, or Firm* — HAYNES BOONE, LLP

(57) ABSTRACT

A hybrid injection-compression variable focal power optical element, a variable focal power optical device including such a hybrid injection-compression optical element and an electronic control system, and an augmented reality headset including at least one group of optical elements including at least one such hybrid injection-compression optical element, a waveguide interposed therebetween for displaying a virtual image and an electronic control system.

25 Claims, 22 Drawing Sheets

(58) Field of Classification Search
USPC .................................................. 351/159.68
See application file for complete search history.

(56) References Cited

U.S. PATENT DOCUMENTS

| | | | | |
|---|---|---|---|---|
| 6,188,526 | B1* | 2/2001 | Sasaya ..................... | G02B 1/06 |
| | | | | 359/666 |
| 7,675,686 | B2* | 3/2010 | Lo ............................ | G02B 3/14 |
| | | | | 359/666 |
| 11,624,919 | B2* | 4/2023 | Dalrymple ......... | G02B 27/0075 |
| | | | | 345/8 |
| 2007/0211207 | A1* | 9/2007 | Lo ......................... | G02B 26/005 |
| | | | | 359/666 |
| 2010/0208357 | A1 | 8/2010 | Batchko et al. | |
| 2012/0019773 | A1 | 1/2012 | Blum et al. | |
| 2012/0092775 | A1* | 4/2012 | Duston ..................... | G02B 3/14 |
| | | | | 359/666 |
| 2012/0113092 | A1* | 5/2012 | Bar-Zeev ................. | G06F 3/012 |
| | | | | 345/419 |
| 2012/0127062 | A1 | 5/2012 | Bar-Zeev et al. | |
| 2012/0147038 | A1* | 6/2012 | Perez ................. | G02B 27/0172 |
| | | | | 345/632 |
| 2013/0141690 | A1* | 6/2013 | Taylor .................... | G02C 7/085 |
| | | | | 351/159.01 |
| 2015/0116656 | A1* | 4/2015 | Stevens .................... | G02B 3/14 |
| | | | | 359/666 |
| 2015/0241196 | A1 | 8/2015 | Gerson | |
| 2016/0004099 | A1* | 1/2016 | Stevens .................... | G02B 3/14 |
| | | | | 351/159.73 |
| 2016/0011393 | A1 | 1/2016 | Kim et al. | |
| 2016/0041406 | A1* | 2/2016 | Ramirez Flores . | G02B 27/0093 |
| | | | | 351/159.68 |
| 2016/0070038 | A1* | 3/2016 | Peyman ................. | G02C 7/085 |
| | | | | 359/666 |
| 2016/0223837 | A1* | 8/2016 | Holland ................... | G02B 3/14 |
| 2016/0361157 | A1 | 12/2016 | Honigsbaum | |
| 2017/0184848 | A1 | 6/2017 | Vallius | |
| 2020/0285077 | A1* | 9/2020 | Leuenberger ........... | G02C 7/085 |
| 2020/0371360 | A1* | 11/2020 | Dalrymple ........... | G02B 26/004 |
| 2021/0278703 | A1* | 9/2021 | Aschwanden ......... | G02C 7/085 |

FOREIGN PATENT DOCUMENTS

| | | |
|---|---|---|
| JP | H02166401 A | 6/1990 |
| WO | 2008050114 A1 | 5/2008 |
| WO | 2013046934 A1 | 4/2013 |
| WO | 2013/144592 A1 | 10/2013 |
| WO | 2014125262 A2 | 8/2014 |
| WO | 2015044260 A1 | 4/2015 |
| WO | 2015184409 A1 | 12/2015 |

OTHER PUBLICATIONS

International Search Report for PCT/GB2019/050131 mailed Apr. 11, 2019, 4 pages.

* cited by examiner

RELATING TO VARIABLE FOCAL POWER OPTICAL ELEMENTS, A VARIABLE FOCAL POWER OPTICAL DEVICE, A DISPLAY MODULE FOR AN AUGMENTED REALITY HEADSET AND AN AUGMENTED REALITY HEADSET

PRIORITY

This application is a national stage application, filed under 35 U.S.C. § 371, of International Application No. PCT/GB2019/050131, filed on 17 Jan. 2019, which claims the benefit of, and priority to, United Kingdom patent application no. 1800933.2, which was filed 19 Jan. 2018 and the contents of which are incorporated herein by reference.

FIELD OF THE INVENTION

The present invention relates to variable focal power optical elements, such, for example, as lenses or mirrors of the kind that comprise a fluid-filled envelope having a wall formed by a distensible membrane which can be selectively distended or contracted to form an optical surface having a specific curvature. The invention also provides a variable focal power optical device which includes at least one variable focal power optical element in accordance with the invention, a display module for an augmented reality headset which includes at least two variable focal power optical elements according to the invention with a transparent waveguide display interposed therebetween, and an augmented reality headset that includes at least one such display module.

BACKGROUND TO THE INVENTION

Fluid-filled variable focus lenses ("liquid lenses") are known in the art and may be of the "compression" or "injection" type.

A typical injection-type liquid lens is disclosed by WO 02/063353 A2 in which a cavity comprising a variable amount of transparent fluid is defined between a flexible membrane, which is held in tension between two inter-engaging rings, and a rigid sheet. Fluid can be introduced or removed from the lens through a hole drilled through the rings to enable it to function as a variable focus lens. The maximum power of the lens is limited by volume of fluid that is available for introduction into the lens and the material properties of the lens, including the strength of the rings, the stiffness of the rigid plate and the strength of any bonds or welds. Since an injection-type lens contains a variable amount of fluid between the flexible membrane and the rigid sheet, it has the advantage that when the flexible membrane is in a state in which it has a curvature that is like the surface shape of the rigid sheet, which may typically be flat or convex, the lens may be relatively thin, since only minimal fluid is required between the flexible membrane and the rigid sheet in that state. However, if it is desired to allow the membrane to adopt concave configurations to provide negative optical powers, the lens must be made thicker, with a greater spacing between the flexible membrane and the rigid sheet.

Where an injection-type liquid lens is used in a pair of spectacles, fluid withdrawn from the lens may be held in a reservoir located in a temple arm of the spectacles as disclosed, for example, in U.S. Pat. No. 2,576,581. It will be understood that in such an arrangement, the person skilled in the art has a degree of freedom in the location of the reservoir and may select a position away from the lens to optimise the location of the spectacles' centre of gravity.

Another injection-type variable focus lens is disclosed by WO2008/050114 A1 which comprises a ring for holding a flexible membrane in which the ring is provided with an integral hollow extension, the hollow interior of the extension forming a liquid reservoir for the lens.

A typical compression-type lens is disclosed by WO 99/061940 A1 in which a closed chamber having opposed walls formed by a transparent wall member and a distensible membrane is filled with a transparent liquid and means are provided for changing the spacing between the transparent wall member and the distensible membrane for varying the pressure of the transparent liquid in the chamber. A fixed-focus rigid lens is arranged exteriorly of the chamber, abutting the transparent wall member.

WO 2014/125262 A2 discloses a method of manufacturing a variable focus fluid lens assembly which comprises adjusting the volume of a fluid within a cavity that is closed at one end by a distensible transparent membrane to calibrate the lens assembly. Fluid may be added to or taken away from the cavity through a needle inserted into the cavity. Alternatively, a small separate reservoir of fluid may be provided within a lens housing which is connected to the cavity via a suitable conduit, and an adjuster may be provided for expelling fluid from the reservoir into the cavity, or for withdrawing fluid from the cavity into the reservoir in order to adjust finely the volume of fluid within the cavity. Once the lens assembly has been correctly calibrated, the adjuster may be locked, for instance irreversibly locked, to prevent further adjustment. Alternatively, the reservoir and conduit may be removed, or the adjuster may be removed. In a further embodiment, the conduit may be severed or disconnected from the cavity. Where the lens assembly is incorporated into eyeglasses, the reservoir may be accommodated within frames, bridge pieces or temples of the eyeglasses outside the field of view. Since only a small amount of fluid is needed to provide fine adjustment/calibration of the volume of fluid within the cavity, the reservoir may be small and can be easily concealed within the lens housing or within other parts of the eyeglasses. It will be understood that injection or withdrawal of fluid from the cavity according to WO2014/125262 A2 occurs only for calibrating the lens assembly and is not used for continually adjusting the focal power of the lens assembly in use.

US 2016/0361157 A1 discloses an accommodative hydraulic intraocular lens system having a cylindrical actuator contained within which is an hydraulic lens assembly. The hydraulic lens assembly has a transparent elastically reconfigurable membrane coupled to a fixed-focus lens by a bellows and a refractive hydraulic fluid contained in a space defined by the membrane, the bellows and the lens, and is maintained at an upper range of its dioptre power by the elastic properties of the bellows, springs, or both. Fill-purge ports are provided for filling the hydraulic fluid chamber with the required refractive hydraulic fluid and purging it of bubbles before implantation in a patient's eye, or it can alternately be filled and purged before implantation but implanted with some of the fluid withdrawn to facilitate folding, the remainder of the fluid being introduced by a fill-purge tip, the tubing connected thereto left in place for the purpose and withdrawn after implantation. The ports may include a pair of mechanically penetrable seals, one at each end, to block flow into or out of the hydraulic chamber once tubular fill-purge tips are withdrawn.

Since a compression-type lens contains a fixed volume of liquid, it has the disadvantage that its thickness cannot be minimised in the same way as an injection-type lens can be when the distensible membrane is in a state in which it has a curvature that is like the surface shape of the wall member. For a membrane that forms a spherical surface of variable curvature in a compression-type lens, a volume conserving "neutral circle" will exist that is common across membrane states. The neutral circle is defined by the intersection of a plane with the membrane, such that the volume of transparent liquid that is bounded by the plane and membrane is equal above and below that plane. In other words, the volume of liquid inside the neutral circle is equal to that displaced outside of it. The centre of the neutral circle is both the point of maximum distension of the membrane and the optical centre (hereafter "OC") of the membrane. In a compression-type lens, the neutral circle is located at a fixed distance from the transparent wall member, which sets a limit on the minimum thickness of the lens.

A further disadvantage of a compression-type lens is that the maximum curvature of the distensible membrane is limited by the clearance between the distensible membrane and the transparent wall member.

However, an advantage of a compression-type lens is that it lends itself to the use of a resiliently bendable membrane support for supporting the distensible membrane around its edge, as disclosed, for example, in WO 2013/144533 A1, the contents of which are incorporated herein by reference. A bendable membrane support allows the profile of the edge of the membrane to be varied as the membrane distends or contracts to form a projection of itself onto multiple spheres, which is necessary when the shape of the membrane is non-round, or if it is required to give the membrane a more complex form defined by one or more Zernike polynomials (e.g. cylinder), for example for use in ophthalmic applications.

Another advantage of a compression-type lens is that it typically requires less power to effect a change of focal power than an injection-type lens, with the response time of a compression-type lens being limited by the membrane, while the response time of an injection-type lens is limited by the size of the holes for injecting fluid into the lens.

One object of the present invention therefore is to provide a variable focal power optical element, such, for example, as a lens or mirror, that alleviates at least some of the disadvantages associated with known compression- and injection-type liquid lenses.

An application for adjustable lenses is in the field of head-up displays (HUD) and helmet-mounted displays, as disclosed for example in EP 3091740 A1 in which a binocular display device comprises two ocular assemblies to be worn by a user concurrently with one respective ocular assembly at each eye, each ocular assembly comprising an outer optical part having a positive optical strength arranged for receiving external light from an external scene and for directing the result to a transparent waveguide display part of the device that is arranged for outputting substantially collimated display light and an inner optical part having a negative optical strength arranged for receiving both the external light and the substantially collimated display light from the waveguide display part and for imposing a divergence on the received display light to generate a virtual focal point substantially common to each ocular assembly and outputting the result for display whereby, in use, an image conveyed by the display light is superimposed on the external scene as a three-dimensional image when viewed through the binocular display device. The device comprises a controller unit arranged to control the optical strength of the two divergent lenses such that the virtual focal point remains substantially common to each ocular assembly, and such that it may vary in position.

A well-known problem associated with augmented and virtual reality headsets is accommodation-vergence conflict in which a mismatch between the degree of accommodation and degree of vergence with which a user views a virtual 3D image on a display near the user's eyes can lead to headache, fatigue and/or nausea.

In some aspects, another object of the present invention is to alleviate the problem of accommodation-vergence conflict in an augmented reality headset.

SUMMARY OF THE INVENTION

According to a first aspect of the present invention, there is provided a hybrid injection-compression variable focal power optical element such, for example, as a lens or mirror comprising a fluid-filled envelope having a rigid first wall, a second wall opposite the first wall which comprises a distensible membrane held under tension around its edge by a peripheral support ring, and a collapsible side wall extending between the first and second walls. The envelope is filled with a substantially incompressible fluid, and an electronically operable injector is provided for introducing more or withdrawing some of the substantially incompressible fluid into or from the envelope through a port in the envelope. The first and second walls are coupled together in such a manner as to permit movement of the peripheral support ring towards or away from the first wall, and at least one spacing control device is provided for controlling the spacing between the peripheral support ring or one or more regions thereof and the first wall. The variable focal power optical element of the first aspect of the invention is thus a hybrid injection-compression device having a focal power that is continually adjustable in use (i.e. during normal use) by controlling the spacing between the support ring, or one or more regions thereof, and the first wall and the volume of the fluid in the envelope.

By incorporating both fluid-injection and fluid-compression technologies, the amount of fluid in the envelope of a hybrid injection-compression variable focal power optical element in accordance with the invention can be minimised according to the state of distension of the distensible membrane, thereby to minimise the thickness of the variable focal power optical element. Thus, in states in which the form of the membrane is like the surface shape of the first rigid wall, fluid may be withdrawn from the envelope to minimise its thickness.

To increase the optical power of the variable focal power optical element, additional fluid may be introduced into the envelope using the injector to cause the distensible membrane to distend convexly relative to the envelope, and the spacing control device may be operated to maintain the membrane support ring near the first rigid wall.

Alternatively, the spacing control device may be operated to move the membrane support ring away from the first rigid surface, causing the distensible membrane to contract concavely relative to the envelope, with additional fluid being injected into the envelope using the injector if required. In this way, in some embodiments, the distensible membrane of the variable focal power optical element of the present invention may be capable of both positive and negative optical powers.

In some embodiments, the membrane may be circular, but as used herein, the term "ring" is not intended necessarily to imply a circular shape and, in some embodiments, the membrane may be non-round. For instance, in some embodiments, the membrane may have a shape of a kind that is typically employed for spectacle lenses. For example, the membrane may have an Aviator, butterfly, cat-eye, flat-top, pillowed rectangle, rectangle, square or Wayfarer shape.

The distensible membrane has an outer face which forms an optical surface. In some embodiments, the outer face of the distensible membrane may be mirrored such that the adjustable focal power optical element is a mirror.

Alternatively, the adjustable focal power optical element may be a lens, with the distensible membrane being optically clear, the first wall being formed by an optically clear rigid component having an optical outer surface, or an optically clear layer formed on an inner surface of such a component, and the fluid being a refractive fluid.

The distensible membrane may be formed of a non-toxic, elastic material with a glass transition temperature below the usual operating range of the element, preferably below about −5° C., and an elastic modulus in the range 10-200 MPa. Where the adjustable focal power optical element is a lens, the membrane should be optically clear and may have a refractive index of about 1.5.

Various suitable polymer materials are available to those skilled in the art, including cross-linked urethanes and silicone elastomers, e.g., poly (dimethylsiloxane). Thermoplastic aromatic polyurethanes (TPUs) are particularly preferred. A particularly preferred polyether polyurethane is formed from diphenylmethane-4,4'-diisocyanate (MDI), polytetramethylene glycol and 1,4-butanediol having a Shore A hardness of about 86, a density of about 1.12 g/cm3, a tensile strength of about 33 MPa and a tear strength of about 105 N/mm. This material is commercially available from BASF under the trade mark Elastollan® 1185.

The peripheral support ring may be rigid or resiliently bendable. For most applications, the distensible membrane should deform spherically or substantially spherically, in which case a rigid peripheral support ring will be suitable for a round membrane. However, for non-round membrane shapes, or where it is desired that the membrane should deform non-spherically, for example in a form defined by one or more Zernike polynomials, a bendable peripheral support ring is required to control the profile of the edge of the membrane as the membrane distends or contracts so that it may form a projection of itself onto multiple spheres or other surfaces defined by one or more Zernike polynomials. For instance, in some embodiments, the membrane may be required to distend cylindrically, or spherically and cylindrically, e.g. for correction of astigmatism in an ophthalmic application.

Suitably, the spacing control device may comprise an actuator that is arranged to act on the support ring at one or more control points in one or more corresponding regions of the support ring for moving the one or more regions of the support ring towards or away from the first wall. In embodiments in which the support ring is rigid, a single actuator may suffice for moving the whole support ring bodily towards or away from the first wall. However, where the ring is bendable, the one or more actuators may be arranged to act on the ring at multiple control points for displacing the ring differentially at the several control points to control the profile of the edge of the membrane, as described above.

Upon increasing the curvature of the membrane convexly or concavely as described above, the spacing control device may be operated to control the profile of the membrane support ring while keeping the membrane support ring as close to the first rigid surface as possible. In embodiments in which different regions of the membrane support ring are displaced differentially relative to the first rigid surface to maintain the fidelity of the distended or contracted form of the membrane, the spacing control device should be operated to keep the region or regions of the membrane support ring that are displaced relatively the most towards the first rigid surface in close proximity to the first rigid surface.

In some embodiments, a plurality of actuators may be arranged to act on the support ring at a plurality of control points that are spaced apart on the support ring for moving corresponding regions of the support ring towards or away from the first wall.

Various suitable actuators are available to those skilled in the art, but by way of example, the or each actuator may be selected independently from a sliding cam actuator, a rotating cam actuator, a piston, an SMA actuator or a piezo actuator. In some embodiments, the actuator may be manually operable, but advantageously an electronically operable actuator may be used.

Conveniently, the port may be formed in the first wall. In some embodiments, the port may be provided at a location adjacent the side wall. However, in other embodiments, the port may be provided in another location in the envelope—for instance in the collapsible side wall or in the support ring. In some embodiments, multiple ports may be provided to facilitate rapid movement of the fluid into or out of the envelope.

The injector may comprise a reservoir for holding an amount of the fluid outside the envelope and a pump for moving fluid between the envelope and the reservoir via the port. For example, where the adjustable focal power optical element is used in a pair of spectacles or the like, the reservoir may be accommodated in a frame of the spectacles, e.g. in a temple arm.

Suitably, the pump may comprise a positive displacement pump. For example, the injector may comprise a cylinder and a reciprocating piston.

Advantageously, the injector may be electronically operable.

Generally, the fluid should be substantially incompressible. The fluid should have low toxicity and low volatility; it should be inert and exhibit no phase change above about −10° C. or below about 80-100° C. The fluid should be stable at high temperatures and exhibit low microbial growth. In some embodiments, the fluid may have a density of about 1 g/cm3.

For lens applications, the fluid should be transparent and colourless, with a refractive index of at least about 1.5. Suitably the refractive index of the membrane and fluid should be matched, so that the interface between the membrane and fluid is substantially imperceptible to the user.

Various suitable fluids are available to those skilled in the art, including silicone oils and siloxanes such, for example, as phenylated siloxanes. A preferred fluid is pentaphenyltrimethyltrisiloxane.

In some embodiments, the membrane may suitably comprise a polyether polyurethane such, for example, as the above-mentioned material available under the trade mark Elastollan® 1185, and the fluid may comprise a silicone oil or phenylated siloxane, such as pentaphenyltrimethyltrisiloxane. The refractive indexes of the membrane material and fluid are suitably the same or substantially the same and are at least 1.5.

The collapsible side wall may be made from a thermoplastic polyurethane such, for example, as Tuftane®. In some embodiments, the collapsible side wall may form an integral part of a dish-shaped receptacle (or "bag") having an end wall that is contiguously bonded to the first rigid wall. The receptacle may be made from a material that is optically clear and colourless and has a refractive index of at least about 1.5. The refractive index of the receptacle is suitably matched to the refractive index of the membrane fluid, so that the boundary between the receptacle and the fluid is substantially imperceptible to the user.

Suitably, the variable focal power optical element of the present invention may incorporate one or more sensors for directly or indirectly sensing one or more of the volume of fluid in the envelope, the temperature and/or pressure of the fluid, the position of the membrane support ring, or one or more regions thereof, or the curvature of one or more regions of the support ring. Typically the variable focal power optical element will comprise a plurality of such sensors.

In a second aspect of the present invention there is provided an adjustable focal power optical device comprising an adjustable focal power optical element according to the first aspect of the invention and an electronic control system for operating the spacing control device and injector to control the shape of the distensible membrane.

Advantageously, the electronic control system may be operable to minimise the clearance between the support ring/distensible membrane and the first wall for any given distension of the membrane as described above.

Suitably, the electronic control system may comprise a processor and a memory together with the one or more sensors for directly or indirectly sensing one or more of the volume of fluid in the envelope, the temperature and/or pressure of the fluid, the position of the membrane support ring, or one or more regions thereof, or the curvature of one or more regions of the support ring. Any rotation or linear transducer capable of converting $\lesssim 1$ mm linear movement of the support ring into an electronic signal for the control system may be used as a position sensor for determining the position of the support ring, or a region of the support ring adjacent an actuator, or the position of a moving part of an actuator. Suitable examples include: optical encoders, magnetic (e.g. Hall effect) sensors, capacitive sensors and potentiometers. A rotational position microsensor may be used, for example, to measure the position of a cam actuator to give an indirect measure of the position of a region of the support ring adjacent the actuator. Sections of piezoelectric material deposited on to corresponding regions of the support ring may be employed to measure the curvature of those regions.

The processor may be operable to receive an input signal representing or corresponding to a specific focal length and to execute machine code stored in the memory to operate the at least one spacing control device and injector to control the shape of the distensible membrane to the specific focal length based on sensor data received from the one or more sensors and to control the volume of fluid in the envelope to minimise the clearance between the support ring/distensible membrane and the first wall for the specific focal length. The sensor data may include the temperature and/or pressure of the fluid in the envelope, and the position of the support ring, or the positions of one or more regions thereof, and/or the curvature of one or more regions of the support ring. In some embodiments, the sensor data may include the volume of fluid in the envelope.

In a third aspect of the invention there is provided an article of eyewear comprising at least one variable focal power optical element according to the first aspect of the invention. Suitably, an article of eyewear according to the invention may include two variable focal power optical elements according to the first aspect of the invention; one for each eye of a user. In some embodiments, the article of eyewear may comprise an augmented reality device such as an augmented reality headset.

In a fourth aspect of the invention, there is provided an article of eyewear comprising at least one variable focal power optical device according to the second aspect of the invention. Advantageously, the article of eyewear may further comprise an eye-gaze tracking system associated with the variable focal power optical device, the electronic control system being operable to receive a signal from the eye-gaze tracking system that encodes an eye-position variable corresponding to a specific focal power and adjust the focal power of the variable focal power optical element to that specific focal power. Suitable eye-gaze tracking systems are known to those skilled in the art and need not be described herein.

In a fifth aspect of the present invention there is provided a display module for an augmented reality headset comprising a group of optical elements in optical alignment with one another, the group including at least one variable focal power optical element according to the first aspect of the invention.

Suitably, the display module may comprise at least one and preferably at least two variable focal power optical elements and a transparent waveguide display interposed therebetween for outputting a virtual image. The or each of the variable focal power optical elements may comprise a fluid-filled envelope having a first wall that is formed by a surface of an optically clear hard lens or a layer of optically clear material that is laminated to a surface of such an optically clear hard lens, a second wall opposite the first wall that is formed by an optically clear distensible membrane held under tension around its edge by a peripheral support ring, and a collapsible side wall between the first and second walls. The envelope may be filled with a substantially incompressible refractive fluid. At least one port may be provided in the envelope for introducing or withdrawing substantially incompressible refractive fluid into or from the envelope.

The peripheral support ring and hard lens may be coupled together in such a manner as to permit movement of the peripheral support ring towards or away from the first wall. One or more spacing control devices may be provided for actively controlling the spacing between the peripheral support ring, or one or more regions thereof, and the first wall. The one or more spacing control devices may be electronically controllable.

At least one injector may be provided for actively introducing more fluid into or withdrawing some of the fluid from the envelopes of the one or more variable focal power optical elements via their respective ports. The injector may also be electronically controllable.

Conveniently, the injector may have an outlet connected to the port of each variable focal power optical element in the group via at least one respective electronically operable control valve.

The optical power of an outer surface of the distensible membrane of the or each of the at least one or at least two optical elements is typically adjustable in the range about 0 to +5.0 dioptres, e.g. about +0.5 to about +3.0 dioptres. An outer surface of the hard lens of the or one of the optical elements may have an optical power of about −1 to −5 dioptres or about −2 to −4 dioptres, e.g. about −3 dioptres, or about 0 to −1 dioptres, e.g. about −0.5 dioptres. Where at least two optical element are provided, the outer surface of the hard lens of one of the optical elements may have an optical power of about −1 to −5 dioptres or about −2 to −4 dioptres, e.g. about −3 dioptres, and the outer surface of the hard lens of another of the optical elements may have an optical power of about 0 to −1 dioptres, e.g. about −0.5 dioptres. The optical power of one of the optical elements may therefore be adjustable in the range 0 to −5.0 dioptres, e.g. 0 to −2.5 dioptres, while the optical power of the other optical element may be adjustable in the range 0 to +5.0 dioptres, e.g. 0 to +2.5 dioptres.

More generally, the optical power of an outer surface of the distensible membrane of the or at least one of the variable focal power optical elements may be adjustable in the range +A to +B dioptres, and an outer surface of the hard lens of the hybrid injection-compression lens element may have an optical power of about −A dioptres or about −B dioptres. It will be understood that A and B are variables which are fixed for a given lens element according to the invention, but may vary from one embodiment to another as required. Thus, purely by way of example, A may be +0.5 dioptres and B may be +3.0 dioptres. Suitably, the group may include at least two hybrid injection-compression variable focal power optical elements. An outer surface of the hard lens of one of the hybrid injection-compression variable focal power optical elements may have an optical power of about −A dioptres; an outer surface of the hard lens of the other of the at least two hybrid injection-compression variable focal power optical elements has an optical power of about −B dioptres.

As is known in the art, the transparent waveguide display may be operable to output substantially collimated display light that conveys an image.

In a sixth aspect of the present invention there is provided an augmented reality device such, for example, as an augmented reality headset comprising at least two display modules according to the fifth aspect of the invention for displaying a stereoscopic 3-dimensional image. The augmented reality headset is configured to be worn in front of the user's eyes with at least one display module associated with each eye, and the display modules are arranged such that, within each module, one of the at least two lens elements in the group of optical elements is positioned closer to the user's eye than the other, with the waveguide display interposed therebetween, such that the user can view his or her surroundings through all lens elements and waveguide display within each group, while an image conveyed by light emitted by the waveguide display is viewed only through the closer one of the at least two lens elements within each group.

The augmented reality headset further includes an electronic control system for operating the one or more spacing control devices of each variable focal power optical element of the group of optical elements in each module and the at least one injector to control the shape of the distensible membrane of each variable focal power optical element. The focal power of each variable focal power optical element of each group can thus be adjusted by controlling the spacing between its support ring or the one or more regions thereof and the first wall and the volume of the fluid in the envelope.

In some embodiments, a single injector may be associated with the variable focal power optical elements of both display modules.

The augmented reality headset may further comprise an eye-tracking system, the electronic control system being operable to receive an output signal from the eye-tracking system which encodes a variable related to eye-position that corresponds to a specific focal power, adjust the focal power of one of the at least two lens elements of the group of optical elements in each display module to that specific focal power, and to adjust the focal power of the other one of the at least two lens elements of the group to a corresponding inverse or conjugate focal power that wholly or partially negates the focal power of the one lens element. By adjusting the focal power of the one lens element in each module that is positioned between the waveguide display and the user's eye, the image conveyed by the display light emitted by the waveguide display can be viewed by the user in a virtual focal plane corresponding to the user's point of gaze. In this way, conflict between the user's accommodation and vergence can be avoided. The focal power of the other lens element in each module is adjusted as described above to negate the focal power of the one lens element so that the user's view of his or her surroundings is substantially unaffected. As the user's point of gaze changes, the virtual focal plane of the image conveyed by the display light emitted by the waveguide display can be updated in real time.

In some embodiments, the eye-tracking system may include at least one respective eye-tracking device such, for example, as an eye-tracking camera associated with each display module. The eye-tracking system may be operable to receive an input signal that encodes an eye position value from each of the eye-tracking devices, calculate a variable as a function of the two eye position values that corresponds to a specific focal length and output the output signal representing the specific focal length. The control system may be operable to receive the output signal representing the specific focal length, adjust the focal powers of the one lens elements in both display modules to that specific focal power according to the calculated variable, and to adjust the focal powers of the other lens elements in both display modules to conjugate focal powers that wholly or partially negate the focal powers of the respective one lens elements.

DETAILED DESCRIPTION OF THE INVENTION

Following is a description by way of example only with reference to the accompanying drawings of embodiments of the various aspects of the present invention.

BRIEF DESCRIPTION OF THE DRAWINGS

In the drawings:

In FIG. 7A, the lens element is shown in a state of minimum actuation; FIGS. 7B and 7C show the lens element in states of intermediate actuation; FIG. 7D shows the lens element in a state maximum actuation.

In FIG. 21A, the front lens element is minimally actuated, while the rear lens element is maximally actuated so that the net optical power through the rear lens element is zero. In FIG. 21B, the front lens element is maximally actuated, while the rear lens element is minimally actuated, so that the net optical power through the rear lens element is non-zero. In both cases, the net optical power through the entire display module is zero.

Figure 1:
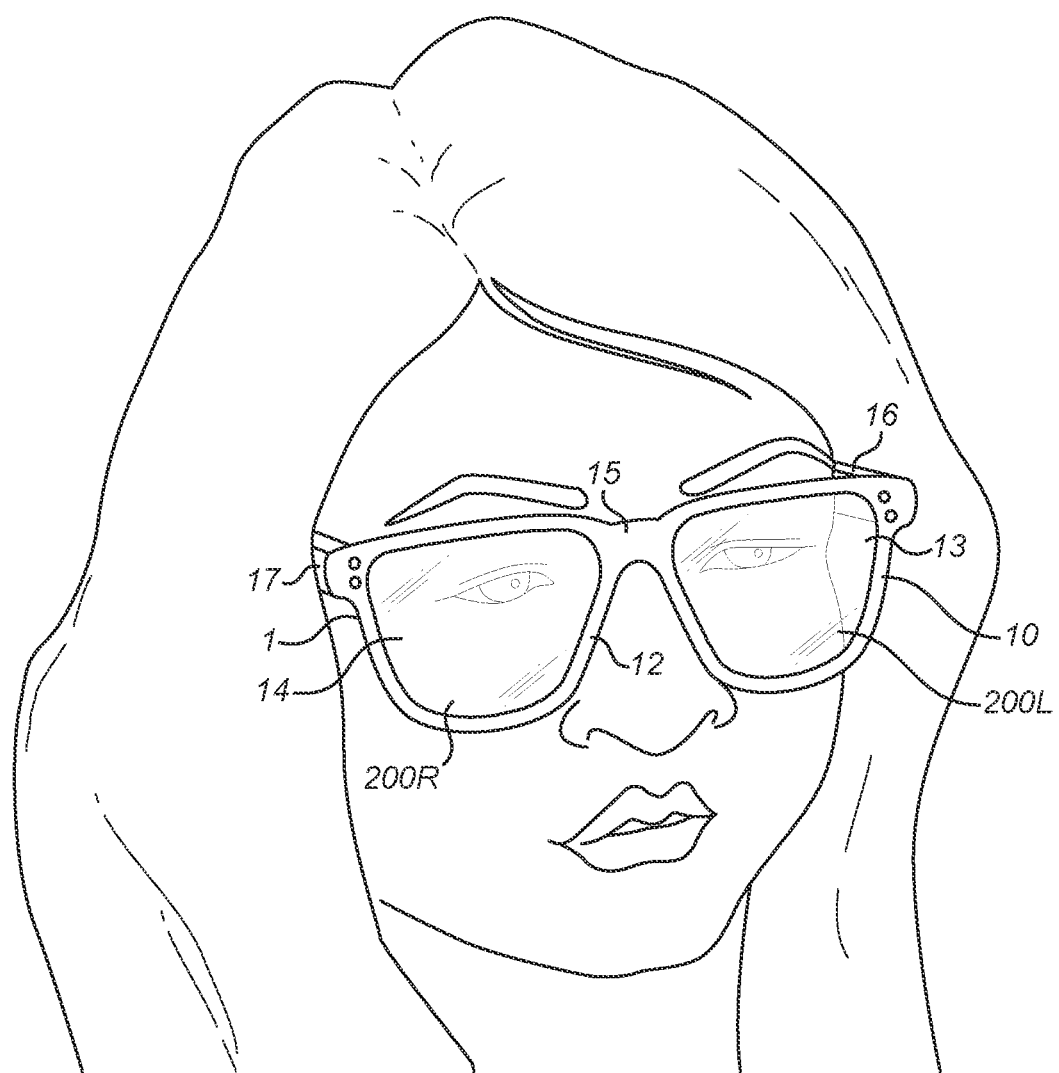
FIG. 1 is a schematic perspective view of an article of eyewear as worn by a user, the article of eyewear comprising right- and left-hand hybrid injection-compression variable focal power fluid-filled lens elements in accordance with the invention.

EXAMPLE 1: EYEGLASSES INCLUDING A VARIABLE FOCAL POWER HYBRID INJECTION-COMPRESSION Fluid-Filled Lens A pair of eyeglasses 1 in accordance with one embodiment of the present invention comprises a frame 10 which supports left- and right-hand variable focal power fluid-filled lens elements 200L, 200R in front of a user's eyes when worn, as illustrated schematically in FIG. 1. The frame 10 includes a frame front 12 with left and right apertures 13, 14, which are shaped to receive the left- and right-hand lens assemblies 200L, 200R, a nose-bridge 15 and left and right temple arms 16, 17, as is usual in the field of eyeglasses.

The terms "right" and "left" as used herein refer to the anatomical right and left sides, respectively, of the user. The terms "front", "forwardly" and the like and "rear" (or "back"), "rearwardly" and the like refer to locations that are respectively further away from, or closer to, the user's face. "Top" and "bottom" relate to the usual upright orientation of the user. Parts of the glasses that are closer to the user's nose are referred to herein as being a "nose" part or the like, while parts that are closer to one of the user's temples are a "temple" part or the like. It will be understood that the nose and temple sides of the left-hand lens assembly 200L are on the right side and left sides respectively of the left-hand lens 200L, while the opposite is the case for the right-hand lens assembly 200R.

As can be seen from FIG. 1, the left- and right-hand lens assemblies 200L, 200R are non-round. They have the same shape as each other, but are mirror images of one another about the user's sagittal plane, which extends through the nose-bridge 15 of the spectacles 1. Each of the lens assemblies 200L, 200R extends transversely from a respective nose-side of the lens element, adjacent the nose-bridge 15 of the spectacles 1, which rests on the user's nose when the spectacles 1 are worn, to a temple side, adjacent the respective temple arm 16, 17.

The left-hand lens assembly 200L is shown in more detail in FIGS. 2-9, but it will be understood that the following description applies equally to the right-hand lens assembly 200R.

Figure 5:
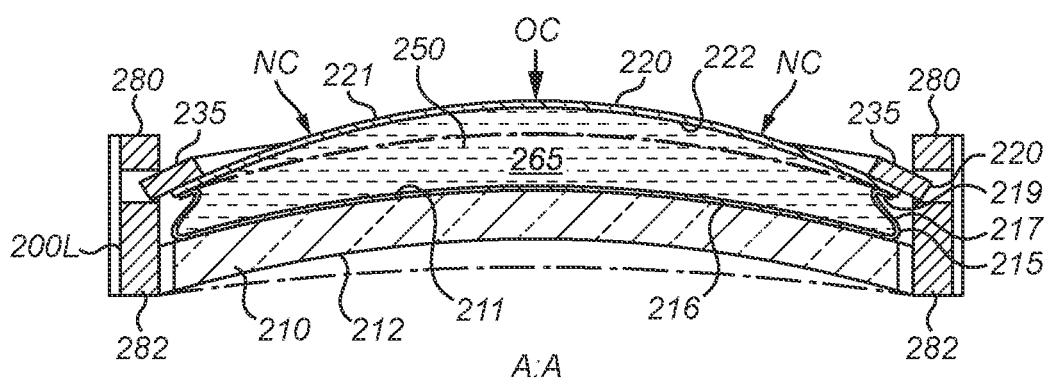
FIG. 5 is a cross-sectional view from below of the lens element of FIG. 4 along the line A:A of FIG. 4.

As best shown in FIG. 5, the left-hand lens assembly 200L comprises a non-round rigid rear lens 210 which is formed from a hard, optically clear material of the kind that is commonly used for making ophthalmic lenses. The rear lens 210 has a front surface 211 and a rear surface 212. The rear surface 212 of the rear lens 210 serves as a rear optical surface of the lens element 200L, as described below. The rear lens 210 may have any suitable shape and may be a converging lens, a diverging lens, or it may have substantially no optical power on its own. The rear lens 210 may be a prescription lens for correcting a refractive error in the user's vision. As illustrated in the drawings, the rear lens 210 may suitably be a meniscus lens with a convex front surface 211 and a concave rear surface 212.

The rear lens 210 is seated within a housing of the left-hand lens assembly 200L. The housing, which is omitted from the drawings for clarity, serves to support and protect the various components of the lens assembly 200L and is fixedly secured within the left-hand aperture 13 of the frame 10. The right-hand lens assembly 200R comprises a similar housing which is fixedly secured in the right-hand aperture 14 of the frame 10.

As best shown in FIGS. 7A-7E, the rear lens 210 is formed, at its temple side, with a fluid-injection port 240 which extends through the rear lens and opens onto the front surface 211 in a mouth 241. (The fluid injection port 240 is omitted from FIGS. 5 and 6A-C for clarity.) The function of the port 240 is described in more detail below.

The front surface 211 of the rear lens 210 carries a dish-shaped receptacle 215 (or "bag") comprising a rear wall 216 having a shape that corresponds to the shape of the front surface 211 of the rear lens 210 and a collapsible peripheral side wall 217 that extends forwardly from the rear wall 216 within the housing of the lens assembly 200L and terminates in a peripheral lip 219. In the present embodiment, the dish-shaped receptacle 215 is made from an optically clear, flexible thermoplastic polyurethane (e.g. Tuftane®, which is commercially available from Messrs. Permali Gloucester Ltd, Gloucester, UK) and its rear and side walls 216, 217 are about 50 μm thick, but other transparent materials, especially transparent elastomers, may be used and the thickness adjusted accordingly.

The rear wall 216 of the dish-shaped receptacle 215 is formed with an aperture 218 adjacent its temple side and is bonded contiguously to the front surface 211 of the rear lens 210 by means of a transparent pressure-sensitive adhesive (PSA) such, for example, as 3M® 8211 adhesive such that the aperture 218 is aligned with the mouth 241 of the port 240 in the rear lens 210. In the present embodiment, a layer of PSA about 25 μm thickness is used, but this may be varied as required.

The peripheral lip 219 of the dish-shaped receptacle 215 is joined to a distensible membrane 220 having a non-round shape that corresponds to the shape of the rear lens 210. The membrane 220 is formed from a sheet of a thermoplastic polyurethane (e.g. Elastollan® 1185A10, which is commercially available from Messrs. BASF) and has a thickness of about 220 μm. Other suitable materials that may be used for the membrane 220, as well as the other components of the lens element 200L, are disclosed by WO 2017/055787 A2, the contents of which are incorporated herein by reference.

Figures 2, 3:
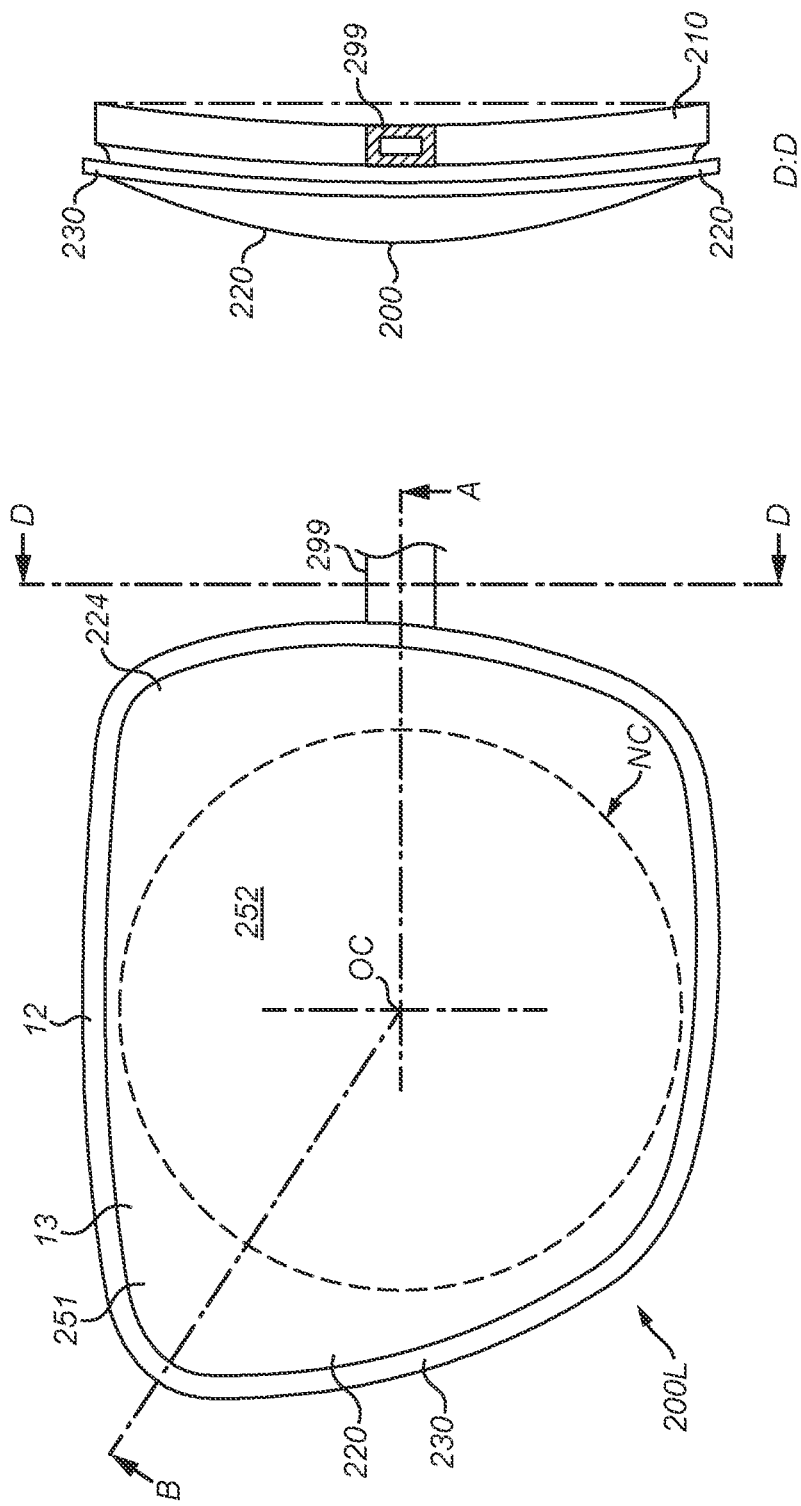
FIG. 2 is a front view of the left-hand hybrid injection-compression lens element of the article of eyewear of FIG. 1.
FIG. 3 is a side view from the left of the left-hand hybrid injection-compression lens element of FIG. 2, which is partly in cross-section along the line D:D shown in FIG. 2.
Figure 4:
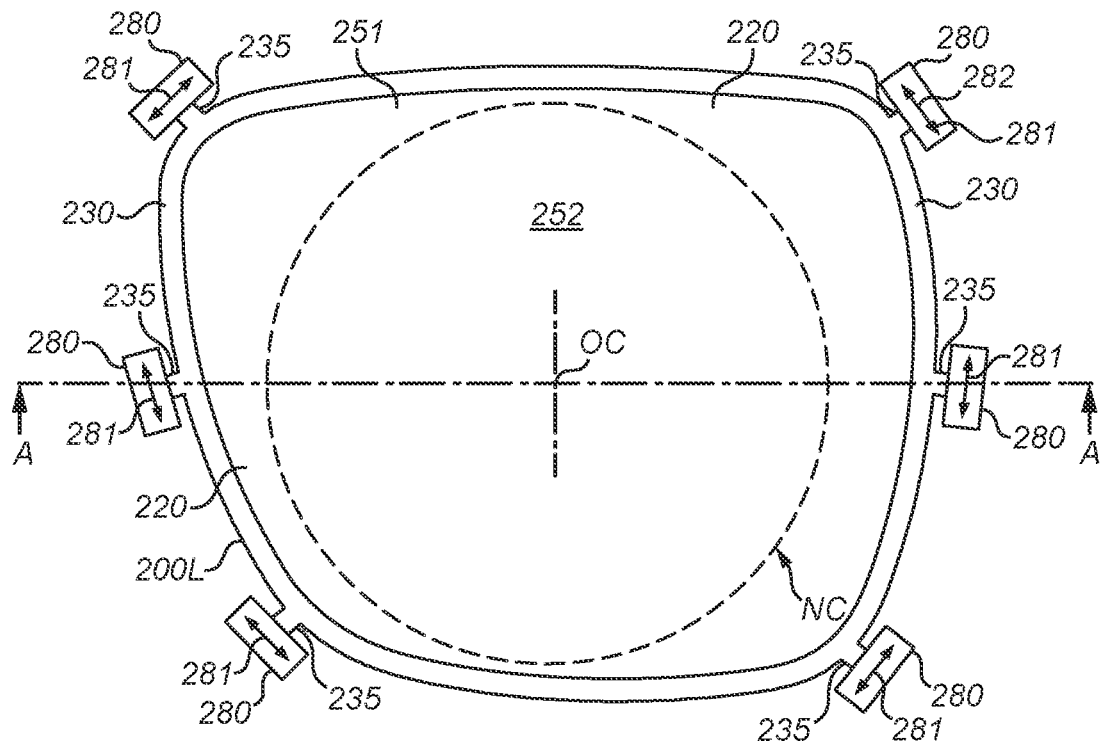
FIG. 4 is another plan view of the left-hand hybrid injection-compression lens element corresponding to FIG. 2, which shows a plurality of actuators disposed around the periphery of the lens element for actuating the lens element.

The membrane has a front surface 221, a rear surface 222 and is held under tension around its periphery by a resiliently bendable support ring 230, as best seen in FIGS. 2 and 4. As described in more detail below, the front surface 221 of the membrane 220 forms a front optical surface for the lens assembly 200L, with the optical power of the lens being determined by the curvature of the front surface 221 of the membrane 220 and the rear surface 212 of the rear lens 210.

The support ring 230 is fabricated from a sheet of stainless steel and has a thickness of about 0.55 mm, but more generally the ring may have a thickness in the range about 0.50-0.60 mm, or the support ring may comprise a stack of two or more ring elements instead of a single ring. The front surface 221 of the membrane 220 is bonded to the support ring 230 with a light curable adhesive (e.g. Delo® MF643 UV curing epoxy adhesive) or other means and is held at a line tension of about 200 Nm$^{-1}$.

Figure 6A:
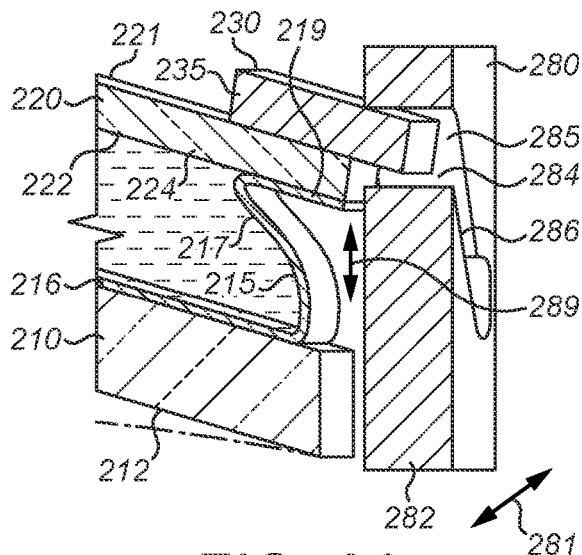
FIGS. 6A, 6B and 6C show in cross-section three different types of actuator for use with a hybrid injection-compression lens element according to the invention.
Figure 6B:
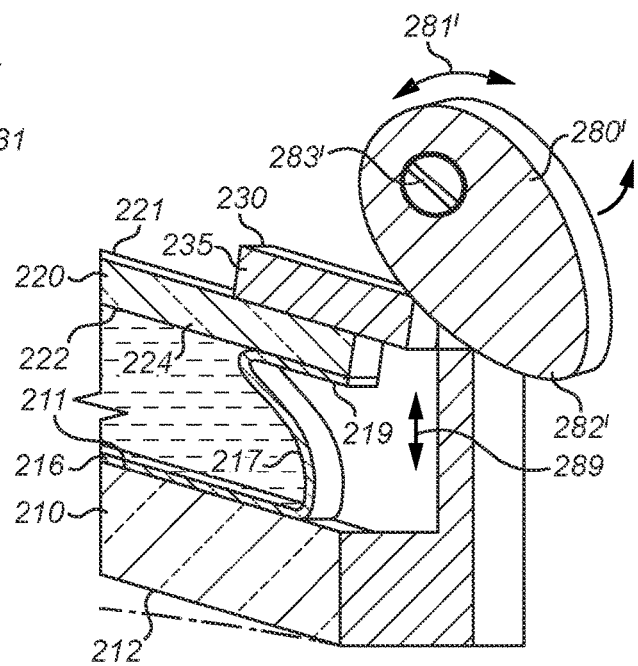
Figure 6C:
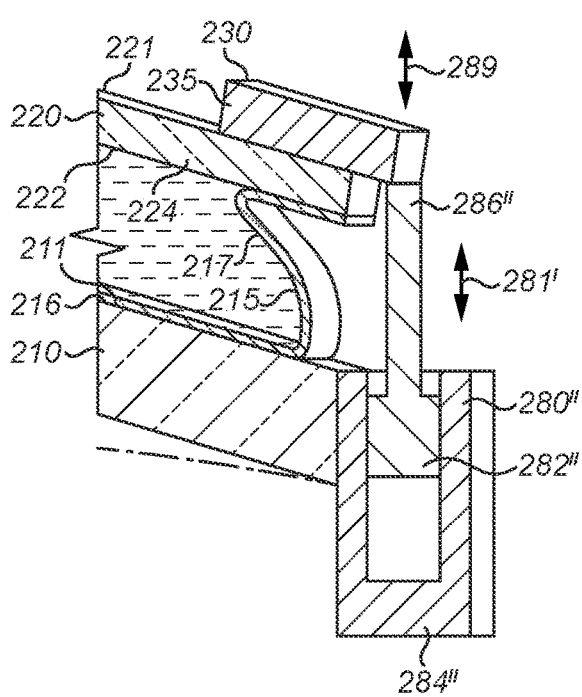

The lip 219 of the dish-shaped receptacle 215 is bonded to a peripheral region 224 of the rear surface 222 of the membrane 220 using a suitable adhesive (e.g. Delo® MF643 UV curing epoxy adhesive) or other means such, for example, as ultrasonic welding, laser welding and the like, as best shown in FIGS. 6A-C, such that the membrane 220 is sandwiched between the lip 219 of the dish-shaped receptacle 215 and the support ring 230.

The ring 230 is able to move within the housing of the lens assembly 200L towards and away from the rear lens 210, with the side wall 217 of the dish-shaped receptacle 215 folding on itself or extending respectively to allow such movement.

In other embodiments of the invention, more than one support ring 230 may be used. For example, the membrane 220 may be sandwiched between two similar support rings as described, for example, in WO 2013/144533 A1. In the present embodiment, only one ring is described for simplicity.

As best seen in FIG. 4, the membrane support ring 230 is formed with a plurality of peripherally spaced, outwardly protruding tabs 235. Without interfering with the housing of the lens assembly 200L as such, these tabs 235 engage corresponding actuators 280 that are mounted within the housing and positioned around the lens assembly 200L for adjusting the optical power of the lens assembly 200L, as described in more detail below. The number and positions of the tabs 235 are dependent on the shape of the lens assembly 200L and the desired degree of accuracy for shaping the membrane 220 into a spherical optical surface. In the present embodiment, there are six tabs 235 and corresponding actuators 280, with three of the tabs 235 being positioned at the nose side of the lens assembly 200L and the other three being positioned at the temple side of the lens assembly 200L. In other embodiments, there may be more or fewer tabs 235 as required. In general, there should be a minimum of at least three tabs 235.

The front surface 211 of the rear lens 210, the sidewall 217 of the bag 215 and the membrane 220 form an envelope having an interior cavity 250.

The cavity 250 of the envelope is filled with a sensibly incompressible, optically clear, refractive fluid 265. The fluid 265 should be colourless and have a refractive index of at least about 1.5. Suitably the refractive index of the membrane 220 and fluid 265 should be matched, so that the interface between the membrane 220 and fluid 265 is substantially imperceptible to the user. The fluid 265 should have low toxicity and low volatility; it should be inert and exhibit no phase change above about −10° C. or below about 100° C. The fluid 265 should be stable at high temperatures of at least about 80° C. and exhibit low microbial growth. In some embodiments, the fluid 265 may have a density of about 1 g/cm$^3$. Various suitable fluids are available to those skilled in the art, including silicone oils and siloxanes such, for example, as phenylated siloxanes. A preferred fluid is pentaphenyltrimethyltrisiloxane.

In the present embodiment, the membrane 220 is formed from a polyether polyurethane (e.g. Elastollan® 1185) and the fluid 265 is a phenylated siloxane, e.g. pentaphenyltrimethyltrisiloxane. The refractive indexes of the membrane material and fluid are suitably the same or substantially the same and are at least 1.5.

Suitable methods for assembling the lens assembly 200L, with the membrane 220 under tension as aforesaid, are disclosed in WO 2017/055787 A2.

As described above, the actuators 280 are operable for moving the tabs 235 on the ring 230 forwards and backwards within the housing, away from and towards the rear lens 210 respectively. Whilst the specific design of the actuators 280 is unimportant for the purposes of the present invention, in the present embodiment shown in FIGS. 5 and 6A, each actuator is a sliding cam actuator comprising a block 282 that is mounted within the housing adjacent the corresponding tab 235 for sliding movement in the plane of the support ring 230 in a direction substantially tangential to the support ring 230, as indicated by the arrows 281 in FIG. 4, at the location of the corresponding tab 235. For example, the block 282 may be mounted within tracks or other suitable guides (not shown) formed within the housing. The block 282 is formed with an angled slot 284 as best shown in FIG. 6A, which receives the corresponding tab 235 and defines two opposing cam surfaces 285, 286, such that reciprocating movement of the block 282 in the plane of the support ring 230 drives the tab 235 forwards and backwards within the housing as desired, as indicated by the double-headed arrow 289 in FIG. 6A. A small motor may be provided for driving each individual block 282 within its tracks or guides.

In one embodiment, each of the actuators 280 may be hydraulically controlled by a single master actuator as disclosed, for example, by WO 2014/118546 A1, the contents of which are incorporated herein by reference. Each of the actuators 280 may be operably connected to the hydraulic master actuator by a tube containing hydraulic fluid for transmitting an actuation force from the master actuator to the actuator 280. As described in WO 2014/118546 A1, the hydraulic tubes may be disposed around the periphery of the ring 230, or they may pass through the envelope 250. In the latter case, the hydraulic fluid and the tubes should be optically clear and have a refractive index that is the same as or similar to the refractive index of the refractive fluid 265 within the envelope 250, so that the tubes and hydraulic fluid within them are not visible or hardly visible to the user.

Alternative actuators 280' and 280" are illustrated in FIGS. 6B and 6C respectively, in which parts that are similar to corresponding parts in FIG. 6A are indicated by the same reference numerals.

FIG. 6B shows a cam actuator 280' which comprises a cam member 282' that is eccentrically mounted on a pin 283' for rotation as indicated by the double-headed arrow 281' in the figure. The cam member 282' engages the corresponding tab 235 as shown for driving the tab 235 and the support ring 230 in the region of the tab 235 rearwardly towards the rear lens 210 within the housing. When the cam member 282' is rotated in the opposite direction, the tab 235 is allowed to move forwards away from the rear lens 210 owing to the resilience of the support ring 230 and the pressure of the fluid 265 within the cavity 250.

FIG. 6C shows an hydraulic actuator 280" which comprises a piston 282" that is mounted slidably within an hydraulic cylinder 284" for reciprocating movement in a direction forwards and backwards with respect to the lens assembly 200L. The piston 282" is fitted with a forwardly protruding rod 286" which is connected to the tab 235 as shown in FIG. 6C, such that reciprocating movement of the rod 286" under the influence of the piston 282" causes the tab 235 and the region of the membrane support ring 230 in the vicinity of the tab 235 to move forwards and backwards relative to the rear lens 210.

As with the sliding cam actuators of FIG. 6A, the cam actuator 280' and hydraulic actuator 280" of FIGS. 6B and 6C respectively may be operated by individual motors or maybe driven by a single motor or hydraulic master actuator.

Figure 8:
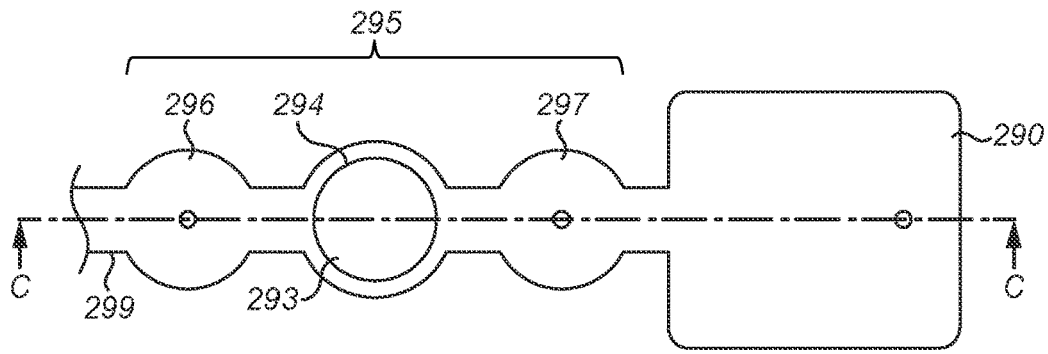
FIG. 8 is a plan view of a fluid injector which forms part of the left-hand hybrid injection-compression lens element of FIGS. 2-7.
Figure 9:
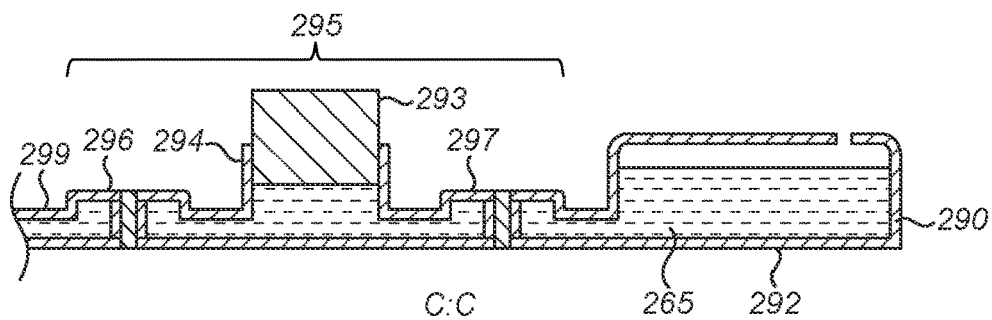
FIG. 9 is a side view of the injector of FIG. 8 shown in cross-section along the line C:C of FIG. 8.

The fluid-injection port 240 is connected to a fluid injector 290, as shown in FIGS. 8 and 9 for injecting more refractive fluid 265 into the cavity 250 or for removing some refractive fluid 265 from the cavity 250. As described below, various different kinds of injector may be used for this purpose, but in the present embodiment, the injector 290 comprises a vented chamber 292, which serves as a reservoir for the refractive fluid 265 outside the cavity 250 within the lens assembly 200L, an outlet tube 299 for connecting the injector 290 to the port 240 and a positive displacement pump 295 comprising a reciprocating piston 293 within a cylinder 294, a first valve 296 intermediate the outlet tube 299 and a second valve 297 intermediate the chamber 292. By operating the piston 293 and first and second valves 296, 297, refractive fluid 265 can be injected into or withdrawn from the cavity 250. When the first valve 296 is closed, the volume of refractive fluid 265 within the cavity 250 of the lens assembly 200L is fixed, and the first valve 296 serves as a pressure stop against a positive pressure in the cavity 250 that may be caused by distending the membrane 220 as described in more detail below, an hydrostatic pressure gradient or other sources.

Figure 10:
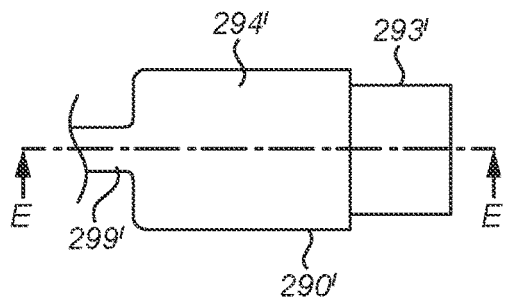
FIG. 10 is a plan view of an alternative fluid injector for use in a hybrid injection-compression lens element according to the invention.
Figure 11:
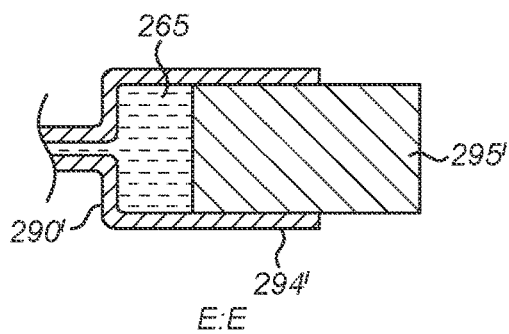
FIG. 11 is a side view of the alternative injector of FIG. 10 shown in cross-section along the line E:E of FIG. 10.

An alternative injector 290' is shown in FIGS. 10 and 11, in which parts that are like corresponding parts in FIGS. 8 and 9 are indicated by the same reference numerals. The alternative injector 290' comprises a piston 293' that is disposed and arranged to reciprocate within a cylinder 294' and an outlet tube 299' for connecting to the fluid injection port 240 of the lens assembly 200L. The alternative injector 290' of FIGS. 10 and 11 is simpler than the injector 290 of FIGS. 8 and 9, with the cylinder 294' effectively serving as a reservoir for the refractive fluid 265 as well as serving with the piston 293' for pumping the refractive fluid 265 into or out of the cavity 250 within the envelope of the lens assembly 200L. Increased pressure within the cavity 250 of the lens assembly 200L for a given volume of refractive fluid 265 in the cavity can be resisted by temporarily restraining of the piston 293' within the cylinder 294'.

Figure 7A:
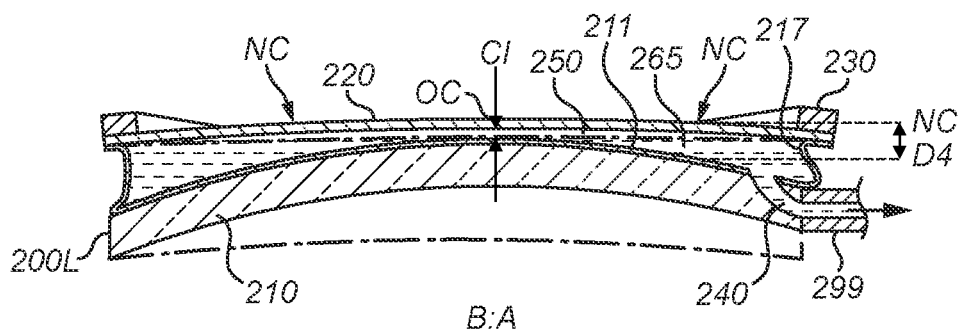
FIGS. 7A, 7B, 7C and 7D are cross-sectional views of the left-hand hybrid injection-compression lens element of FIG. 2 along the line B:A of FIG. 2.
Figure 7B:
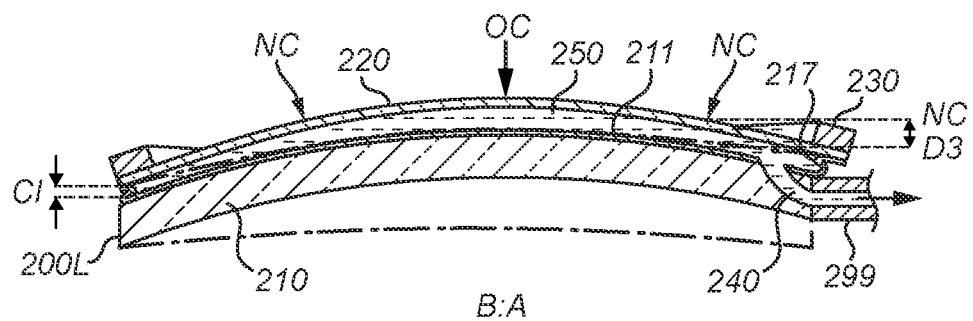
Figure 7C:
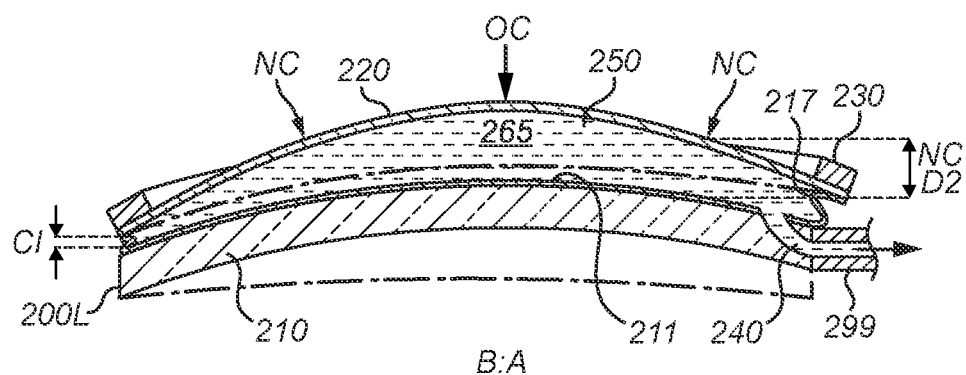
Figure 7D:
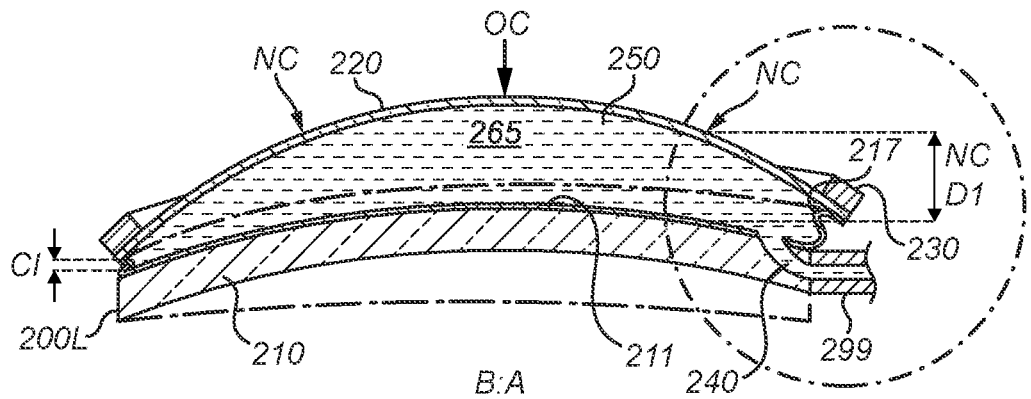
Figure 7E:
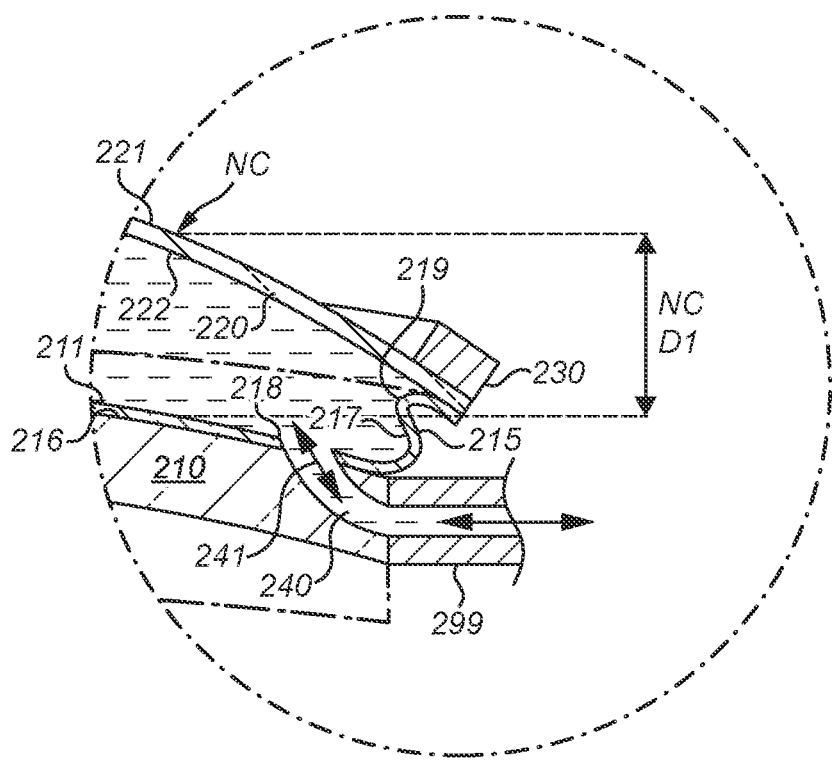
FIG. 7E is an enlarged view of part of FIG. 7D showing an inlet port for introducing fluid into or withdrawing fluid from the lens element.

FIGS. 7A-7E illustrate operation of the lens assembly 200L according to the invention. By operating the injector 290 to inject more refractive fluid 265 from the reservoir 292 into the cavity 250, the membrane 220 is caused progressively to distend forwards from a state of minimum distension as shown in FIG. 7A, through intermediate states as shown in FIGS. 7B and 7C, to a state of maximum distension as shown in FIG. 7D. As the membrane 220 becomes more distended, the optical power of the lens assembly 200L becomes more positive, with the overall optical power of the assembly 200L being defined by the curvature of the membrane 220 and the curvature of the rear surface 212 of the rear lens 210. As shown in FIG. 7A, even in the minimum distended condition, the membrane 220 preferably has some positive (forwards) curvature for stability.

To make the optical power of the lens assembly 200L less positive, fluid 265 is withdrawn from the cavity 250 by operating the injector 290 in reverse, displacing fluid 265 from the cavity 250 to the reservoir 292.

Although the lens assembly 200L of the present embodiment may be operated to give the distended membrane 220 a range of different forms, in practice the form of the membrane 220L should be spherical or substantially spherical to add a selectively variable amount of optical power to the optical power of the rear lens 210. Suitably, the rear surface 212 of the rear lens 210 may have a fixed spherical power and/or cylindrical power and axis according to the user's eye prescription. The additional spherical power provided by the membrane 220 may then be used as and when needed to provide additional optical power to correct for presbyopia or for another optical purpose as described, for example, in Example 2 below.

Owing to the non-round shape of the membrane 220, the edge of the membrane 220 around its periphery must be differentially displaced in the forwards-backwards direction (also called the z-axis) according to the degree of distention of the membrane 220 to maintain a spherical optical surface with an optical centre (OC) at the point of maximum distension on the membrane 220. That is to say, the non-circular boundary of the membrane 220 must be manipulated to form a projection of itself onto multiple spheres. To achieve this, one or more of the actuators 280 can be operated to displace the corresponding one or more tabs 235 and the respective adjacent regions of the support ring 230 locally on the z-axis to control the profile of the membrane support ring 230 and therefore the profile of the edge of the membrane 220, as described in WO 2013/144533 A1, WO 2013/144592 A1 and WO 2015/044260 A1, the contents of which are incorporated herein by reference. Depending on the number of actuators 280 that are provided and their spacing around the ring 230, it may also be possible to control the membrane 220 to adopt forms other than spherical as it distends, particularly other ophthalmically useful forms defined by one or more Zernike polynomials. In general, the greater the degree of distension of the membrane 220, the greater the degree of differential displacement of the support ring 230 that is required to maintain the required membrane form.

By driving one or more of the tabs 235 rearwardly on the z-axis towards the rear lens 220 using one or more of the actuators 280, the fluid-filled envelope formed by the rear lens 210, the bag 215 and membrane 220 is compressed around its periphery, displacing the refractive fluid 265 in the cavity 250 towards the centre of the cavity 250 and causing the membrane 220 to distend forwardly. The greater the displacement of the tabs 235 at the edge of the membrane 220 towards the rear lens 210, the greater the curvature of the membrane 220 and the more positive the optical power of the lens assembly 200L. Conversely, driving the one or more tabs 235 forwardly away from the rear lens 210, or allowing the tabs 235 to move forwards owing to the resilience in the support ring 230 and the pressure of the fluid 265 within the cavity, allows the membrane 220 to become less distended making the optical power of the lens assembly 200L less positive.

It will be understood therefore that to achieve a given optical power for the lens assembly 200L, a combination of injecting or withdrawing refractive fluid 265 from the cavity and operating one or more of the actuators 280 may be employed to ensure that the membrane 220 has the correct degree of curvature and the correct boundary profile to ensure it remains substantially spherical.

For a given volume of refractive fluid 265 within the cavity 250, the envelope defines a "neutral circle" (NC), as indicated in FIGS. 2 and 4, of constant diameter and distance from the front surface of the rear wall 216 of the bag 215 that is bonded to the front face 211 of the hard lens 212 regardless of the degree of distension of the membrane 220 and the corresponding optical power of the lens assembly 200L. The neutral circle is defined by the intersection of a plane with the membrane 220 such that the volume of fluid 265 bounded by the plane and the membrane 220 is equal above and below the plane. In other words, as the membrane 220 is distended forwardly on operation of one or more of the actuators 280, the volume of fluid 265 that is displaced from a peripheral region 251 of the cavity 250 outside the neutral circle NC, as shown in FIGS. 2 and 4, is equal to the volume of fluid that is displaced into an inner region 252 of the cavity 250 within the neutral circle NC. For a given volume of fluid 265, therefore, the minimum thickness of the lens assembly 200L in the front-back direction is limited by a minimum spacing of the neutral circle from the front surface of the rear wall 216 of the bag 215 that is needed to ensure clearance of the membrane 220 from the front surface, indicated by CI in FIGS. 7A-7D.

When the membrane 220 is minimally distended, as shown in FIG. 7A, the minimum clearance CI between the front surface of the rear wall 216 of the bag 215 and the rear surface 222 of the membrane 220 may be at the optical centre OC of the membrane 220, particularly where the front surface 211 of the rear lens 210 is convex, as in the present embodiment. In general, however, for more positive optical powers, the minimum clearance condition CI between the front surface of the rear wall 216 and the rear surface 222 of the membrane 220 will be applied at one or more regions of the support ring 230 where the support ring 230 is locally displaced rearwardly towards the rear lens 210 by the one or more corresponding actuators 280 to produce the correct boundary profile for the corresponding distension of the membrane 220. Suitably, the minimum clearance CI is constant or substantially constant at all states of distension of the membrane 220.

Advantageously in accordance with the present invention, the volume of refractive fluid 265 in the cavity 250 is adjusted using the injector 290, so that the spacing of the neutral circle NC from the front face 211 of the rear lens 210 is dynamically minimised to maintain a minimum clearance condition CI between the front face of the rear wall 216 of the bag 215 and the rear face 222 of the membrane 220 regardless of the degree of distension of the membrane 220. When the membrane 220 is minimally distended as shown in FIG. 7A, the volume of fluid 265 within the cavity 250 is minimised to provide the minimum clearance CI between the front face of the rear wall 216 and the membrane 220 at the optical centre OC of the membrane 220. In this condition, one or more of the actuators 280 may be operated to displace minimally one or more of the corresponding tabs 235 on the support ring 230 to maintain a spherical form of the membrane 220. When more positive optical power is required, refractive fluid 265 is injected into the cavity 250 using the injector 290 through the injection port 240 to "inflate" the fluid-filled envelope, causing the membrane 220 to distend forwardly, as shown in FIGS. 7B-7D. As discussed above, as the membrane 220 is progressively distended, one or more of the actuators 280 are operated to drive the corresponding regions of the support ring 230 locally towards the front surface 211 of the rear lens 210 in order to adjust the profile of the boundary of the membrane 220 to maintain the spherical form of the membrane 220. For each of the progressively increasing degrees of distension as shown in FIGS. 7B-7D, the curvature of the membrane 220 is controlled by the volume of fluid 265 within the cavity 250 and the degree of displacement of the actuators 280 towards the rear lens 210, with the volume of fluid 265 being controlled to maintain the minimum clearance condition CI between the one or more regions of the ring 230 that are locally displaced rearwardly and the front surface of the rear wall 216 whilst moving the neutral circle NC of the membrane 220 forwardly to allow for the required degree of differential displacement of the ring 230 to maintain the spherical form of the membrane 220. In this way, the thickness of the lens assembly 200L according to the invention is minimised for each degree of distension of the membrane 220.

Figure 12:
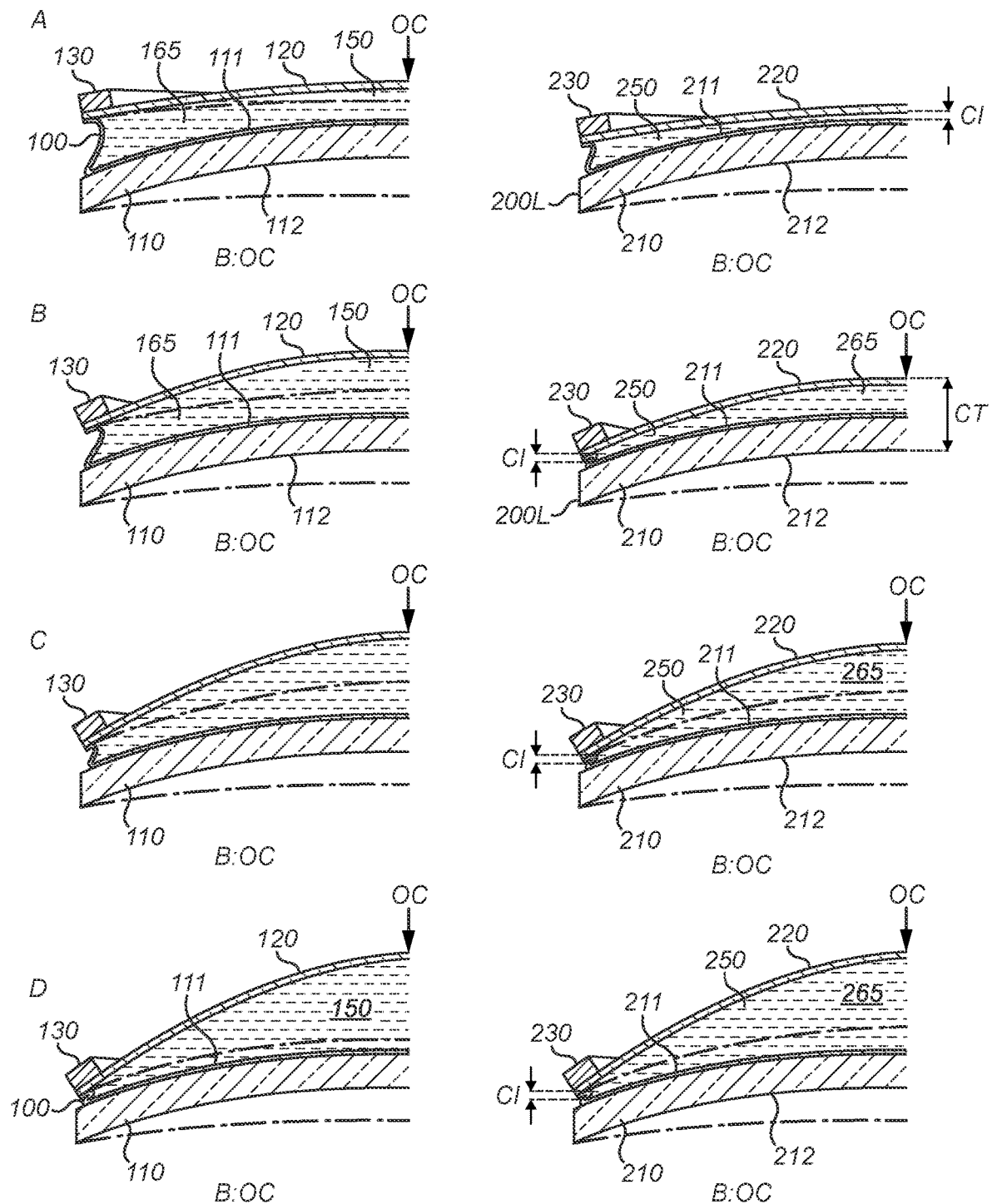
FIG. 12 shows diagrammatically a comparison of the thickness of a hybrid injection-compression variable focal power lens element according to the present invention with a known compression-only type variable focal power lens element.

In FIGS. 7A-7D, the distance between the neutral circle NC of the membrane 220 and the front face of the rear wall 216 of the dish-shaped receptacle 215 is indicated by D1-D4 respectively. As can be seen, the distance between the neutral circle NC of the membrane 220 and the front face of the rear wall 216 increases progressively with increasing forwards distension of the membrane 220 as more fluid is injected into the cavity 250. FIG. 12 shows a comparison of the centre thickness CT of the lens assembly 200L at the optical centre OC in states A, B, C and D, corresponding to FIGS. 7A-7D respectively, with the thickness of a comparable compression-only (fixed fluid volume) reference lens assembly 100, which is not part of the present invention. In FIG. 12, components of the reference lens assembly 100 which have counterparts in the lens assembly 200L of the present example are indicated by corresponding reference numerals, which begin with "1" instead of "2".

The reference lens assembly 100 has a fixed volume of refractive fluid 165, which is the same as the volume of refractive fluid 265 in the lens assembly 200L of the present embodiment in condition D. In the reference lens assembly 100, the maximum forwards distension of the membrane 120 is governed by the clearance between the support ring 130 and the front face of the rear wall 116 of the bag 115 attached to the front surface 111 of the rear lens 110. Since the volume of refractive fluid in the reference lens assembly 100 is fixed, the only possibility for increasing the optical power of the reference lens assembly 100 is by compressing the edges of the assembly as described above. Once one or more regions of the support ring 130 contact the front surface of the rear wall 116, no further compression of the assembly 100 is possible, and the membrane 120 is maximally distended. As the optical power of the reference lens 100 is decreased (made less positive), the support ring 130 moves forwardly away from the rear lens 110 as shown progressively in FIGS. 7C, 7B and 7A, allowing the membrane 120 to relax and become less distended, with the distance of the neutral circle NC forwardly of the rear lens 110 remaining substantially constant.

By contrast, in the lens assembly 200L of the present embodiment, the maximum distension of the membrane 220 in condition D is governed by the available volume of fluid 265 in the reservoir 292 and by the material properties of the components of the assembly, including the strength of the support ring 230, the stiffness of the rear lens 210 and the strength of the bonds between the components. In condition D, the cavity 250 of the lens assembly 200L of the present embodiment contains substantially the same volume of refractive fluid 265 as the cavity 150 of the comparable reference lens assembly 100. The membrane 220 is maximally distended, and in order to maintain the spherical form of the distended membrane 220, one or more regions of the membrane supporting rings 230 are locally displaced rearwardly towards the rear lens 210 to control the shape of the edge of the membrane 220, with the minimum clearance CI between one or more local regions of the support ring 230 and the front surface of the rear wall 216 of the dish-shaped receptacle 215. As the optical power of the lens assembly 200L of the present embodiment is reduced, fluid 265 is removed from the cavity 250 using the injector 290, thereby moving the neutral circle NC rearwardly towards the rear lens 210. The membrane support ring 230 remains differentially displaced in one or more local regions around its circumference towards the rear lens 210 to ensure the spherical form of the distended membrane 220, but the amplitude of the differential displacement of the ring 230 decreases with decreasing forwards distension of the membrane 220, allowing the neutral circle NC to be moved rearwardly by withdrawing fluid 265 from the cavity 250 while retaining the minimum clearance CI between the membrane 220 and support ring 230 and the rear wall 216 of the bag 215. In this way, at all positive optical powers less than the maximum optical power of state D, the thickness CT of the lens assembly 200L of the present embodiment according to the present invention is less than the thickness of the reference compression-only lens assembly 100, and this is most evident in state A.

Figure 13:
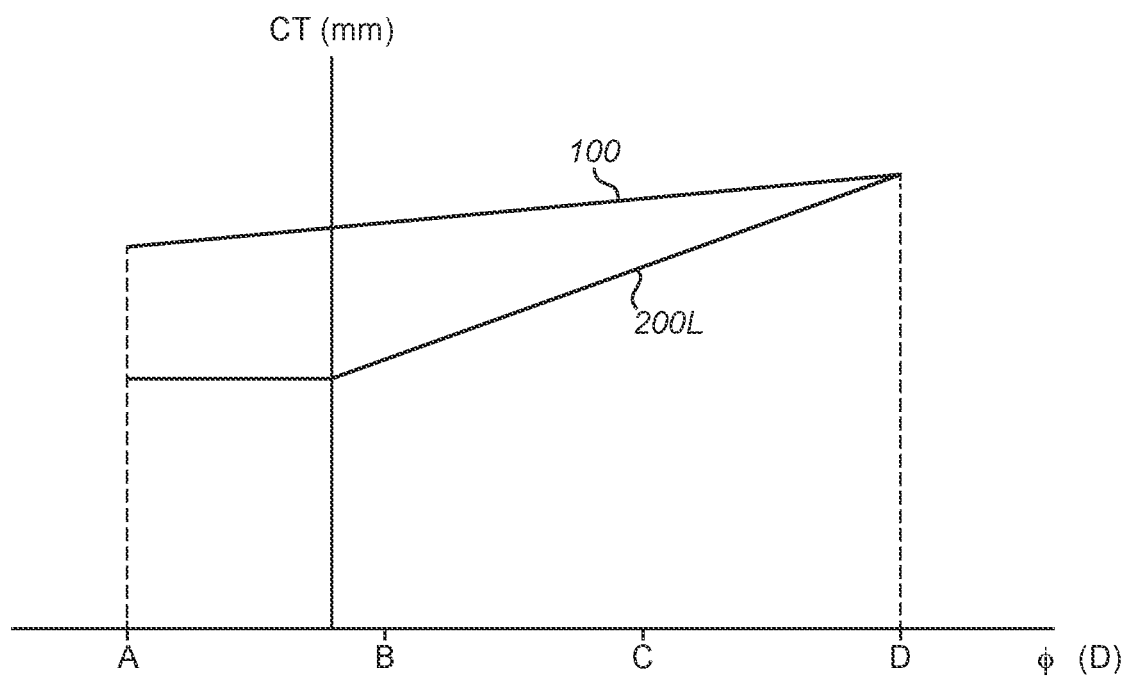
FIG. 13 is a graph which illustrates the thickness savings which are achieved using a hybrid injection-compression lens element in accordance with the present invention at certain actuation states, as compared with a known compression-only type variable focal power lens.

FIG. 13 is a line chart showing how the thicknesses CT of the reference lens 100 and lens assembly 200L of the present invention vary with the optical power 41)(dioptres) of the lens assemblies 100, 200L. As can be seen, at maximum positive optical power (state D) the two lens assemblies have the same thickness CT, but at lower or negative (state A) optical powers, the lens assembly 200L of the present embodiment is substantially thinner than the reference lens assembly 100.

EXAMPLE 2: HYBRID INJECTION-COMPRESSION VARIABLE FOCAL POWER FLUID-FILLED LENS DEVICE

Figure 14:
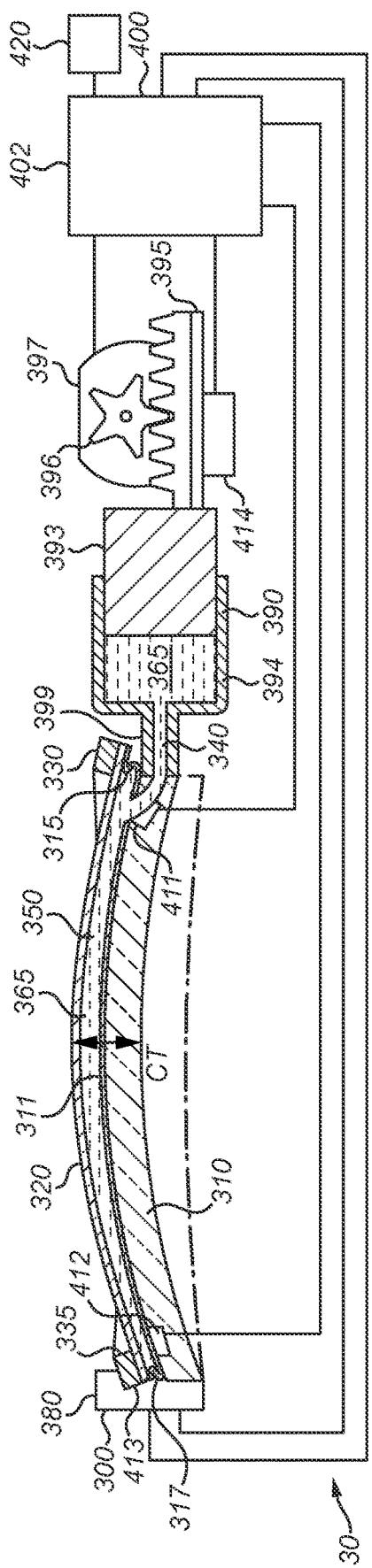
FIG. 14 is a cross-sectional side view of a hybrid injection-compression variable focal power fluid-filled lens device in accordance with the invention which includes an electronic control system for automatic operation of the lens.

FIG. 14 shows hybrid injection-compression variable focal power third-filled lens device 30 which comprises a variable focal power lens assembly 300, which is similar to the lens assembly 200L described above in relation to the pair of eyeglasses 10 of Example 1, and an electronic control system 400 as described in more detail below.

Parts of the lens device 30 of the present example which correspond to similar parts of the lens assembly 200L of the previous example are indicated in the drawings by corresponding reference numerals which are preceded with the number "3" instead of the number "2" and in the interests of brevity are not described again in detail.

Thus, the lens assembly 300 includes a hard rear lens 310, a dish-shaped receptacle 315 which is bonded to a front wall 311 of the rear lens 310 and has a collapsible sidewall 317 and an elastic membrane 320 which is held under tension around its periphery by a resiliently bendable membrane support ring 330. As with the lens assembly 200L of the previous example, the lens assembly 300 has an injection port 340 to let refractive fluid 365 into a cavity 350 defined by the rear lens 310, the sidewall 317 in the membrane 320 from an injector 390 comprising a piston 393 which is arranged for reciprocating movement in a cylinder 394. Using the injector 390, refractive fluid 365 can be injected into or withdrawn from the cavity 350 for inflating or deflating the membrane 320 to increase or decrease respectively the positive optical power of the lens assembly 300.

The membrane supporting ring 330 is formed with a plurality of outwardly extending tabs 335, each of which is engaged by a corresponding selectively operable actuator 380 for actively driving the tab 335 and the adjacent region of the bendable support ring 330 towards or away from the rear lens 310. As with the lens assembly 200L of the previous example, the actuators 380 can be used to control the profile of the ring 330 as the membrane 320 is distended or shrunk in order to control the form of the membrane 320.

The electronic control system 400 is for controlling operation of the actuators 380 and injector 390 for adjusting the optical power of the lens assembly 300.

Figure 15:
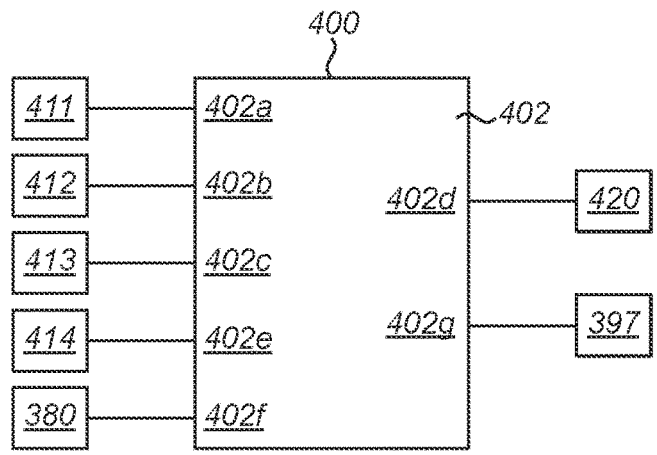
FIG. 15 is a schematic diagram of the electronic control system for the hybrid injection-compression variable focal power lens device of FIG. 14.

The electronic control system 400 comprises a microcontroller 402, which is shown in more detail in FIG. 15. The microcontroller 402 includes a processor and a memory device (not shown) which stores instructions in the form of machine readable code for controlling operation of the lens device 30. Microcontrollers of this kind are well-known in the art and need not be described in detail herein. As shown in FIG. 15, the microcontroller 402 includes a plurality of input-output terminals 402a, 402b, . . . 402g.

Three of the terminals 402a, 402b, 402c are connected to electronic sensors within the lens assembly 300, respectively a pressure sensor 411, a temperature sensor 412 and a position sensor 413 for detecting the position of the supporting ring 330 relative to the rear lens 310. In some embodiments, a separate position sensor may be associated with each actuator 380. Alternatively, or in addition, one or more curvature sensors may be placed around the membrane support ring 330 for detecting the local curvature of the support ring 330. The purpose of the position/curvature sensor(s) is to provide a direct or indirect measure of the profile of the membrane support ring 330. In further variants, fewer sensors may be used, for example two or three sensors selected from a pressure sensor, a temperature sensor, one or a group of position sensors and one or a group of two or more curvature sensors.

As described above, any rotation or linear transducer capable of converting ≲1 mm linear movement of the support ring 330 into an electronic signal for the electronic control system 400 may be used, such, for example as an optical encoder, a magnetic (e.g. Hall effect) sensor, a capacitive sensor or potentiometers. Alternatively, movement of each individual actuator 380 may be measured using a microsensor.

Curvature of one or more regions of the support ring 330 may be measured using curvature sensors. Suitable curvature sensors may comprise one or more sections of piezoelectric material, strain gauges or other kinds of sensor known to those skilled in the art which are disposed on the support ring (330).

Suitably, position and/or curvature sensors may be positioned at those regions of the support ring 330 that are arranged to be closest to the rear lens 310 at all states of distension of the membrane 320.

A fourth one of the terminals 402d is connected to an input device 420 for inputting to the microcontroller 402 the desired optical power of the lens assembly 300. In some embodiments the input device 420 may comprise a user-operable device, which may be manually operated, e.g., a dial, switch or the like, or electronically operated. In the latter case, the input device 420 may comprise an electronic interface which the user can use to input a desired optical power to the microcontroller 402. For instance, the electronic interface may comprise a mobile device such as a mobile telephone or tablet or a personal computer, which may be hardwired or connected wirelessly to the microcontroller 402. In some embodiments—for instance as described in Example 3 below—the focal power of the lens assembly 300 may be adjusted automatically. In such embodiments, the input device 420 may receive a signal from an eye-tracking system or from a range-finding device such, for example, as an optical or ultrasonic sensor.

A fifth terminal 402e is connected to a position encoder 414 that is associated with a rack 395 that is fastened to the piston 393 and protrudes therefrom as shown in FIG. 14. The rack 395 engages a pinion 396 that is arranged to be driven by an electric motor 397 for reciprocating the piston 393 in the cylinder 394 for injecting/withdrawing refractive fluid 365 from the cavity 350 of the lens assembly 300. The position encoder 414 is arranged to sense the position of the rack 395 to provide an indirect measure of the volume of fluid 365 within the cavity 350.

The remaining terminals 402f, 402g of the microcontroller 402 are connected respectively to the actuators 380 and electric motor 397 for operating actuators 380 and injector 390 for controlling the optical power of the lens assembly 300.

A suitable power source (not shown) such, for example, as a battery is provided for powering the actuators 380, motor 397, microcontroller 402, sensors 411-414 and input device 420.

Figure 16:
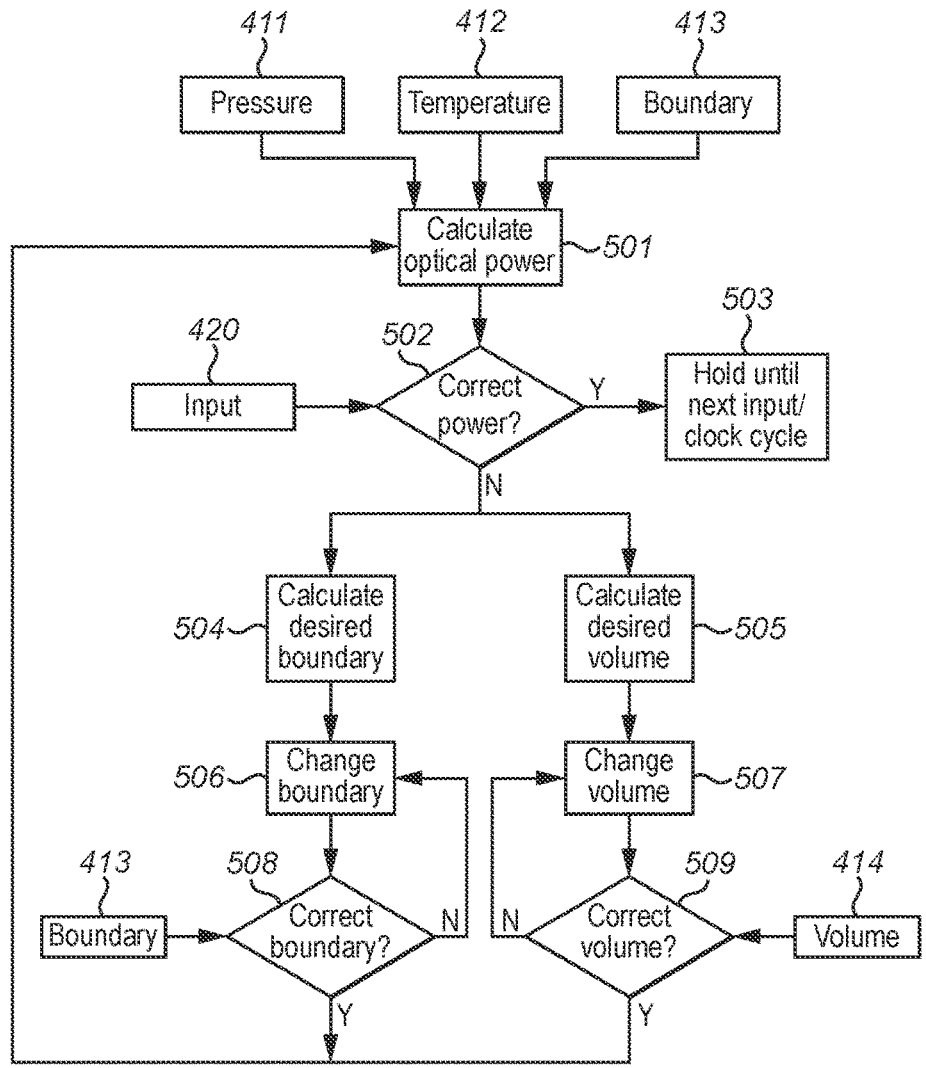
FIG. 16 is a flowchart showing the operation of the electronic control device of FIG. 14.

A flowchart showing the operation of the electronic control system 400 according to the machine code instructions stored in the memory of the microcontroller 402 is shown in FIG. 16.

Signals from the pressure, temperature and position sensors 411, 412, 413 which represent respectively the pressure and temperature of the refractive fluid 365 in the cavity 350 and the position of the membrane supporting ring 330 are received in the microcontroller 402 which, in step 501, executes the instructions stored in the memory device to calculate the current optical power of the lens assembly 300 based on the variable optical power provided by the membrane 320. In step 502, the microcontroller 402 receives an input signal from the input device 420 representing the selected optical power of the lens assembly 300 and checks whether the current optical power is equal to the selected optical power. If the selected optical power according to the input device 420 is equal to the current optical power of the lens assembly 300, no changes are made to the lens assembly 300, and the control system waits in step 503 for the next clock cycle or input from the input device 420.

If the current optical power of the lens assembly 300 is not equal to the inputted selected optical power, the microcontroller 402 calculates the correct profile for the membrane support ring 330 and the correct volume of refractive fluid 365 for the cavity 350 in steps 504 and 505 respectively to impart the correct degree of curvature to the membrane 320 to provide the selected optical power. In steps 506 and 507 respectively, the microcontroller 402 transmits instructions to the actuators 380 and electric motor 397 respectively to adjust the position of the membrane support ring 330 and volume of refractive fluid 365 within the cavity 350 to achieve the correct optical power. Using inputs from the position sensor 413 and position encoder 414, in steps 508, 509, the microcontroller 402 checks whether the position of the support ring 330 and the volume of fluid 365 in the cavity 350 is correct. If one or both are incorrect, steps 506-509 are repeated until the position of the membrane support ring 330 and volume of fluid in the cavity 350 are correct. At the next clock cycle, the process then returns to step 501.

Those skilled in the art will be aware of a number of ways in which the actuators 380 and electric motor 397 can be determined by the microcontroller 402 based on the signals from the sensors 411-414. A particularly convenient method is the use of a look-up table stored in the memory device of the microcontroller 402 which relates the settings of the actuators 380 electric motor 397 to predetermined values of optical power.

As described in Example 1 above, the electronic control system 400 is advantageously set up to ensure that the volume of fluid 365 within the cavity 350 is the minimum necessary for the selected optical power to achieve the corresponding curvature of the membrane 320 and positions of the tabs 335 the membrane support ring 330 relative to the front surface 311 of the rear lens 310. In this way, the thickness of the CT of the lens assembly 300 is minimised for each optical power.

EXAMPLE 3: AUGMENTED REALITY HEADSET

Figure 17:
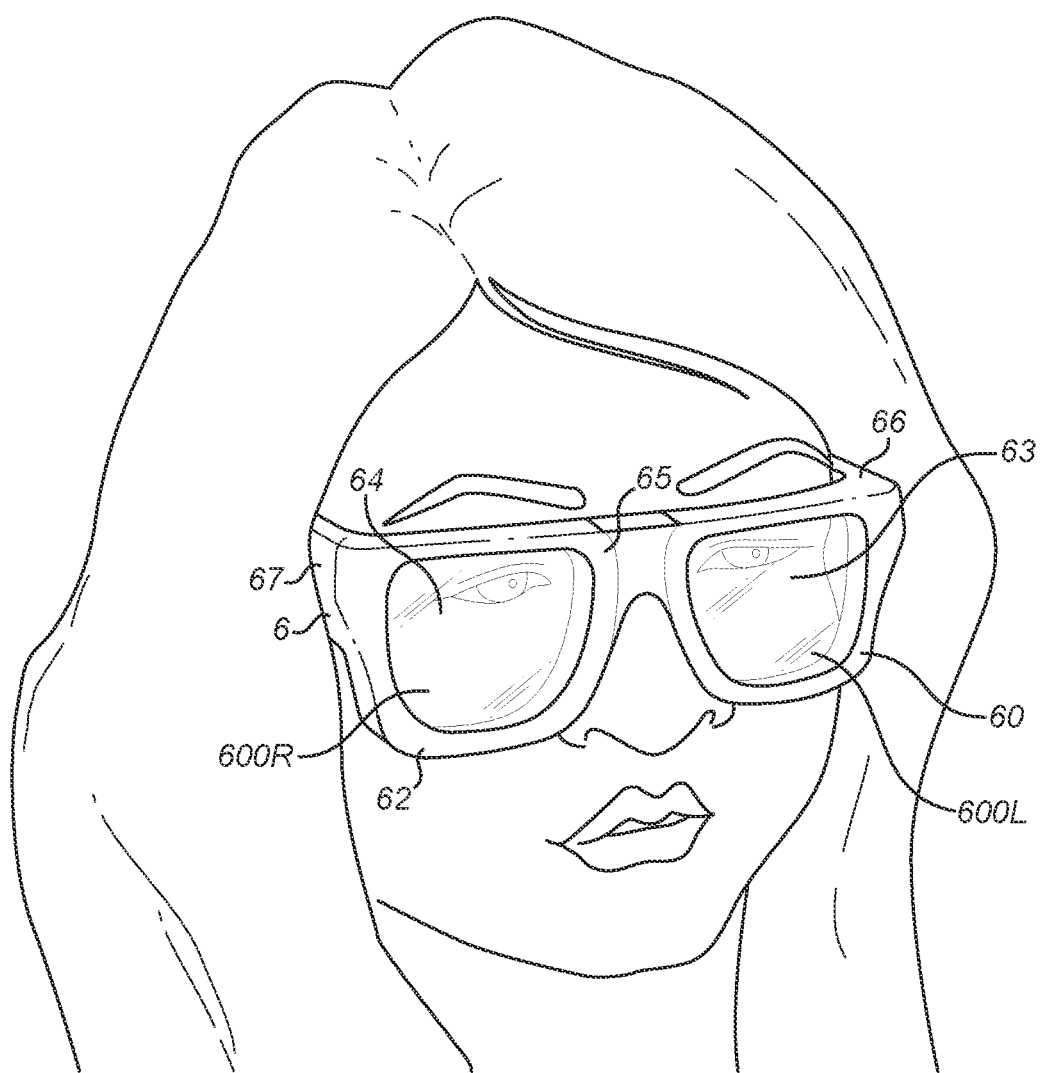
FIG. 17 is a schematic perspective view of an augmented reality headset in accordance with the invention as worn by a user, the augmented reality headset comprising right- and left-hand display modules, each comprising a front and rear pair of hybrid injection-compression variable focal power lens elements and an interposed waveguide.

FIG. 17 illustrates schematically an augmented reality headset 6 according to the present invention when worn by a user. The headset 6 has the same basic form as a pair of glasses, comprising a frame 60 having a frame front 62 that is formed with left and right apertures 63, 64, a nose-bridge 65 and left and right temple arms 66, 67. The appearance of the augmented reality headset 6 of the present example is similar to the appearance of the eyeglasses 1 of Example 1 above, and there are several features in common. For the sake of brevity, the common features are not described again in detail here. In particular, the descriptions of relative position and orientation used to describe the eyeglasses 1 of Example 1 apply equally to the augmented reality headset 6 of the present example.

In the same way as in the eyeglasses 1 of Example 1, the left and right apertures 63, 64 in the frame front 62 of the augmented reality headset 6 are non-round, principally for aesthetic reasons. Whereas the left and right apertures 13, 14 of Example 1 accommodate respective hybrid injection-compression variable focal power fluid-filled lens assemblies 200L, 200R, the left and right apertures 63, 64 of the present example accommodate respective augmented reality display modules 600L, 600R which are described in more detail below.

The left-hand augmented reality display module 600L is shown in FIGS. 18-20, 21A, 21B and 24. As with the eyeglasses 1 of Example 1, the right-hand augmented reality display module 600R is similar to the left-hand module 600L, but is the mirror image of it.

Figure 24:
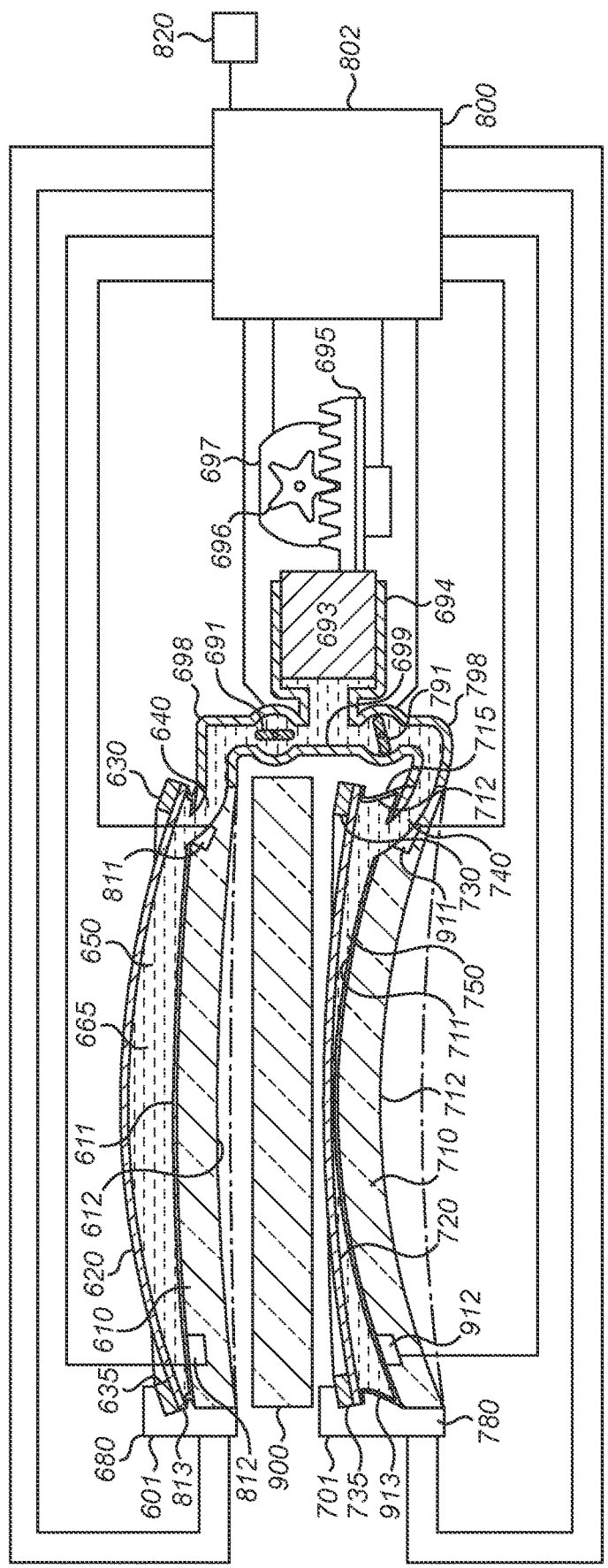
FIG. 24 is another cross-sectional bottom view of the augmented reality display module of FIGS. 18-23, which shows an electronic control system for operating the module, including actuator and position encoder for the injector.

Each of the augmented reality display modules 600L, 600R comprises two hybrid injection-compression variable focus fluid-filled lens assemblies 601, 701, one disposed in front of the other and an electronic control system 800 as shown in FIG. 24. A transparent waveguide display 900 is interposed between the two lens assemblies 601, 701 as best seen in FIGS. 19 and 20.

The waveguide display 900 is arranged to relay a nominally collimated image from a projector into the sight path of the user's eye in a manner known in the field of augmented or virtual reality systems. Accordingly, the waveguide display 900 that forms part of the display module 600L shown in the figures is operably connected to a projector for receiving such a collimated image. The precise details of this are beyond the scope of this invention and are not described in more detail herein. It will be understood that each of the two display modules 600L, 600R includes such a waveguide display 900, allowing a virtual three-dimensional stereoscopic image to be displayed to the user in the manner well known in the field of augmented and virtual reality. The virtual image may be static or may be a moving image.

Figure 19:
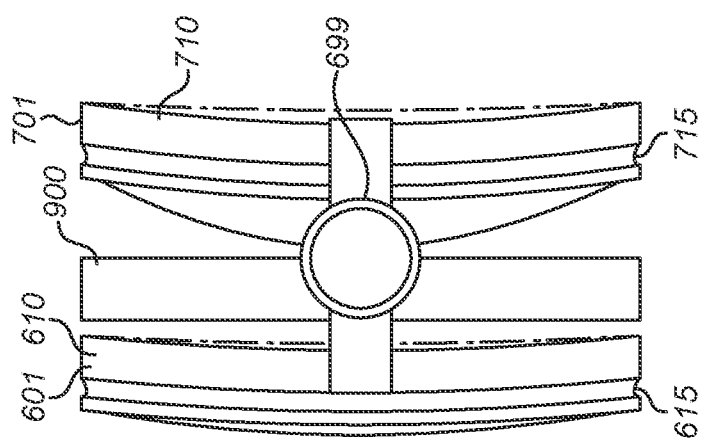
FIG. 19 is a side view from the left of the left-hand display module of FIG. 18.
Figure 18:
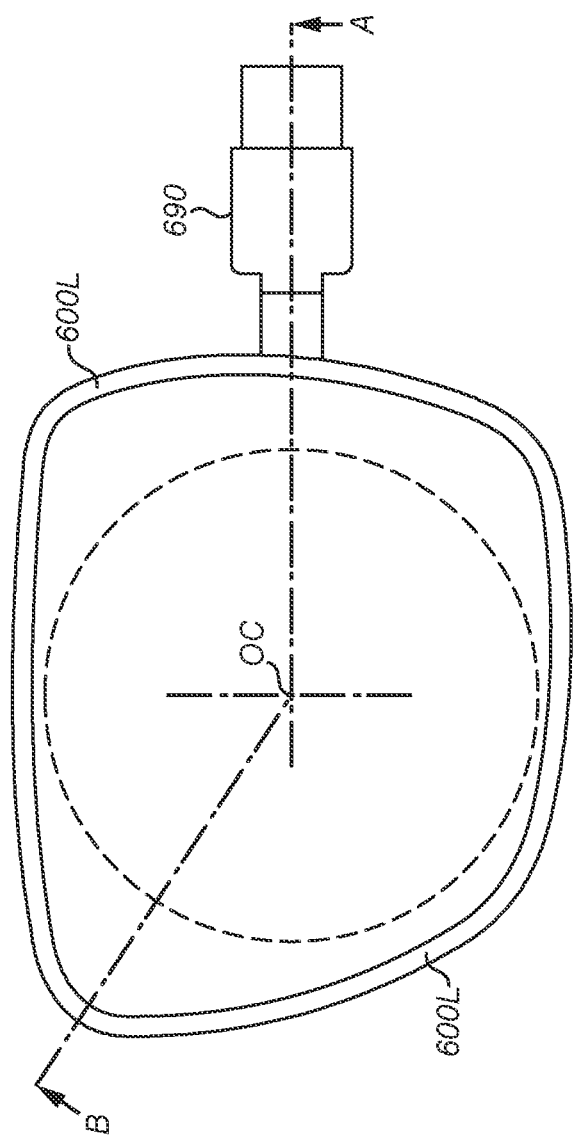
FIG. 18 is a front view of the left-hand display module of the augmented reality headset of FIG. 17 showing an injector for introducing fluid into and withdrawing fluid from the variable focal power lens elements of the module.
Figure 20:
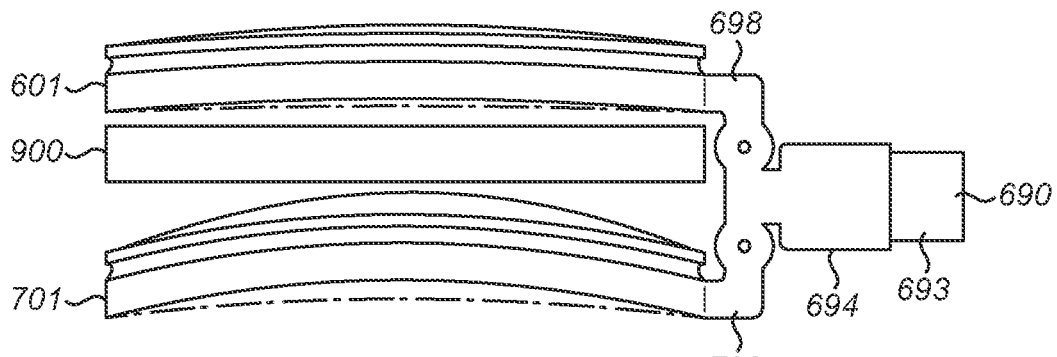
FIG. 20 is a bottom view of the left-hand display module of FIGS. 18 and 19 showing the front and rear hybrid injection-compression variable focal power lens elements and interposed waveguide.

The two lens assemblies 601, 701 thus form a front lens assembly 601 and a rear lens assembly 701, as shown in FIGS. 19 and 20. The user is able to view the real world through each display module 600L, 600R, with light passing through the front and rear lens assemblies 601, 701 of each module, and through the interposed waveguide display 900. The user thus sees the image conveyed by light emitted from the waveguide display 900 superimposed on his or her view of the real world in front of the front lens 601.

Each of the front and rear lens assemblies 601, 701 has a basic structure that is similar to the structure of the lens assembly 200L described in Example 1 above. Parts of the front and rear lens assemblies 601, 701 that correspond to counterpart components of the lens assembly 200L of Example 1 are labelled with similar reference numerals, prefixed by the number "6" or "7" respectively, instead of "2". Similar materials and methods used for constructing the lens assembly 200L of Example 1 may be employed for making the front and rear lens assemblies 601, 701 of the present embodiment.

Figure 21A:
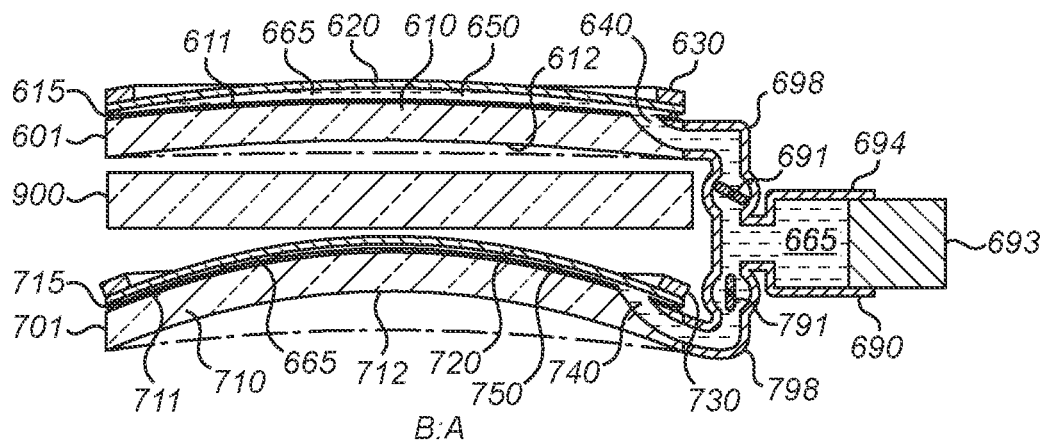
FIGS. 21A and 21B are cross-sectional bottom views of the left-hand display module of FIG. 18 along the line B:A of FIG. 18.
Figure 21B:
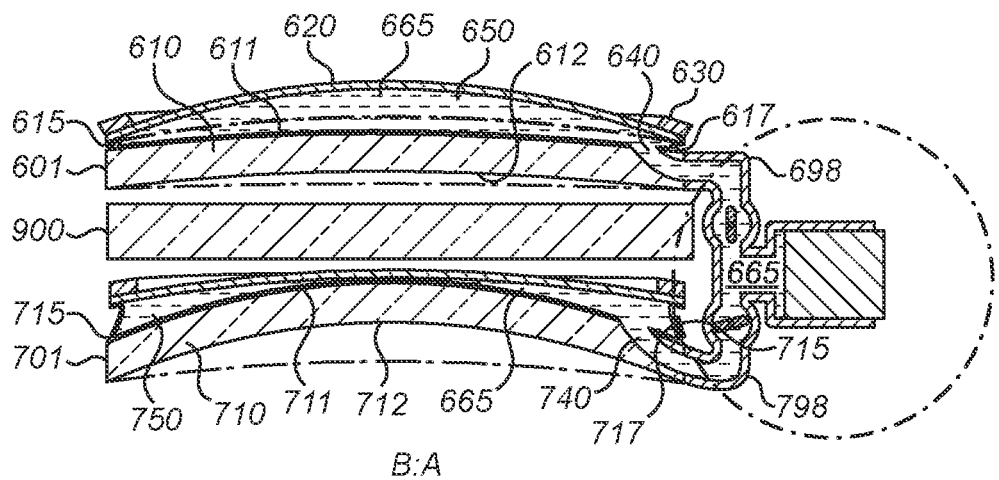
Figure 21C:
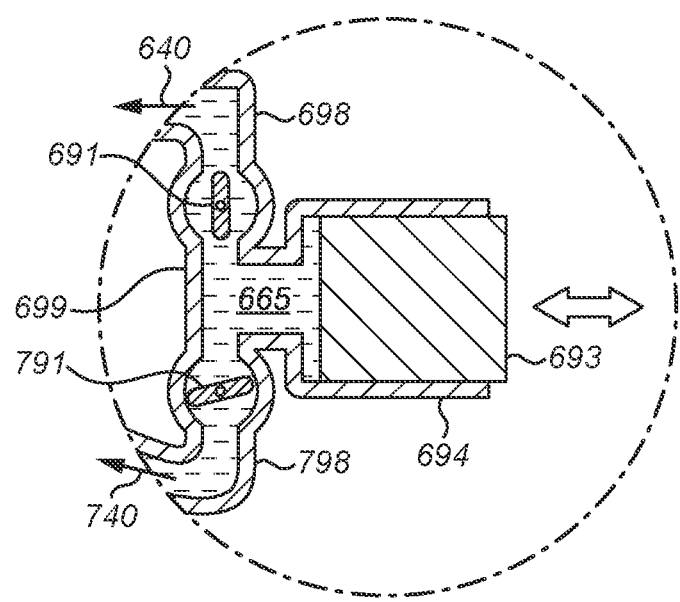
FIG. 21C is an enlarged view of part of FIG. 21B showing the injector connected to inlet ports of the front and rear lens elements with selectively operable fluid control valves for controlling the flow of fluid to the front and rear lens elements.

Thus, as best shown in FIGS. 21A and 21B, each of the front and rear lens assemblies 601, 701 comprises a hard rear lens 610, 710 having a front surface 611, 711 and a rear surface 612, 712, a dish-shaped receptacle 615, 715 (or "bag") having a rear wall 616, 716 that is bonded to the front surface 611, 711 of the rear lens 610, 710 and an elastic membrane 620, 720 that is held under tension (of above about 180-200 N m$^{-1}$) around its edge by a resiliently bendable membrane support ring 630, 730, which is bonded to an out-turned lip 619, 719 formed at the forward end of a collapsible sidewall 617, 717 of the bag 615, 715.

The front surface 611, 711 of the rear lens 610, 710 of each lens assembly 601, 701 thus forms an interior cavity 650, 750 with its respective membrane 620, 720 and the sidewall 617, 717 of the respective bag 615, 715. As in the lens assembly 200L of Example 1, the interior cavity 650, 750 is filled with an optically clear refractive fluid 665. Each of the front and rear lens assemblies 601, 701 is formed with a respective fluid injection port 640, 740 formed in the corresponding rear lens 610, 710 as best seen in FIGS. 21A, 21B and FIG. 24 for injecting or removing the fluid 665 into or from the cavity 650, 750.

As a variant of the lens assembly 200L of the embodiment described in Example 1 above, the injection ports 640, 740 of the front and rear lens assemblies 601, 701 of the present embodiment are connected to a common fluid injector 690 comprising a piston 693 which is arranged for reciprocal movement in a cylinder 694. As shown in FIG. 24, in the present embodiment, the piston 693 is connected to a protruding rack 695 that engages a rotatable pinion 696 which, in turn, is arranged to be driven by an electric motor 697 under the control of the electronic control system 800 as described in more detail below. The motor 697 can thus be operated to drive the piston 693 into or out of the cylinder 694 for injecting or removing fluid 665 from the cavities 650, 750 of the two lens assemblies 601, 701. Numerous other kinds of linear actuator will be apparent to those skilled in the art for operating the piston 693, for example a solenoid.

The injector 690 is connected to the two injection ports 640, 740 by a T-shaped connector 699 having a front branch 698 and a rear branch 798. The front branch 698 is connected to the injection port 640 of the front lens assembly 601, while the rear branch 798 is connected to the injection port 740 of the rear lens assembly 701. The front branch 698 includes a selectively operable valve 691, and the rear branch 798 includes a similar valve 791. The valves 691, 791 can be operated to direct the flow of refractive fluid 665 between the injector 690 and the front or rear lens assembly 601, 701.

While the valves 691, 791 of the present embodiment are represented schematically in FIGS. 21A-21C and 24 as simple "stopcock" type valves, an alternative form of valve 1200 is illustrated in FIGS. 22 and 23A-23C.

Figure 22:
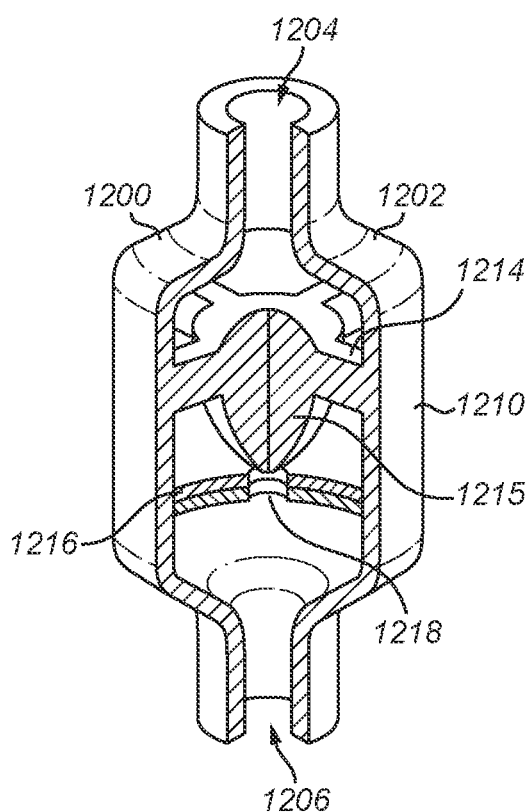
FIG. 22 is a perspective view, which is partly cutaway, of an alternative fluid control valve for use in an augmented reality display module in accordance with the invention.
Figure 23A:
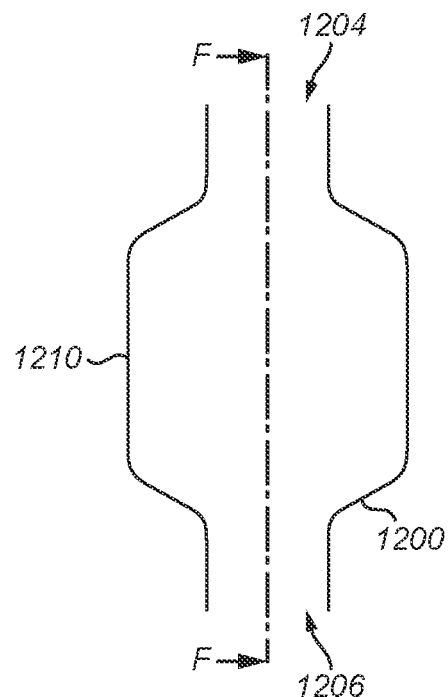
FIG. 23A is a schematic side view of the alternative fluid control valve of FIG. 22.
Figure 23B:
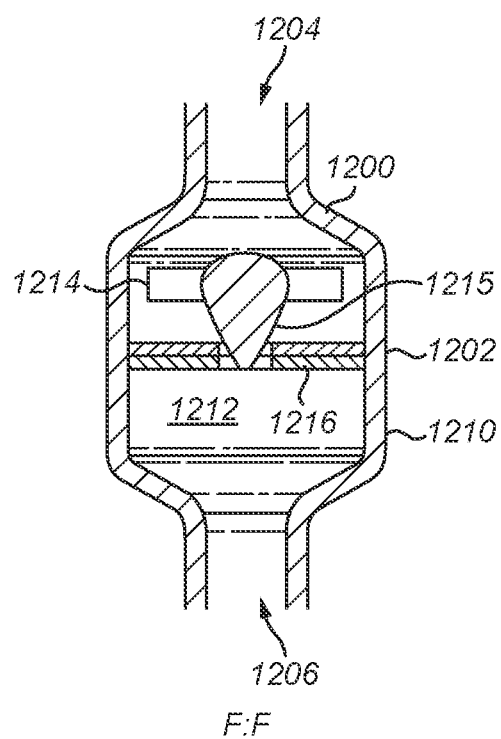
FIG. 23B is a sectional side view along the line F:F of FIG. 23A showing the control valve in a closed condition.
Figure 23C:
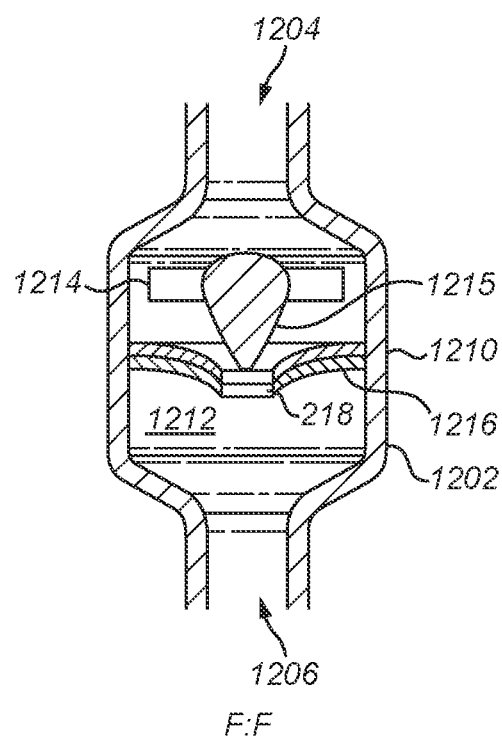
FIG. 23C is a sectional side view along the line F:F of FIG. 23A showing the control valve in an open condition.

The valve 1200 comprises a hollow body portion 1202 of circular cross-section having an inlet 1204 at one end and an outlet 1206 at an opposite end. A central region 1210 of the body portion 1202 is enlarged as shown in FIG. 22 to form an interior chamber 1212 which accommodates a spider 1214 with an integral cone part 1215 that is aligned with a longitudinal axis of the body portion 1212 between the inlet 1204 and outlet 1206 and a piezoelectric bimorph annulus or diaphragm 1216 that defines a central aperture 1218, also on the longitudinal axis of the body portion 1202. The spider 1214 and bimorph annulus or diaphragm 1216 are spaced apart on the longitudinal axis, but are positioned close to one another such that the annulus or diaphragm 1216 engages the cone part 1215 when the bimorph annulus or diaphragm 1216 is unactuated, such that the cone part 1215 seals the aperture 1218, as shown in FIG. 23B. Upon actuation of the bimorph annulus or diaphragm 1216, the annulus or diaphragm 1216 moves out of engagement with the cone part 1215, thus reversibly opening the valve, as shown in FIG. 23C. Upon removing the signal to the piezoelectric bimorph annulus or diaphragm 1216, the annulus or diaphragm 1216 reverts to its natural configuration shown in FIG. 23B, thereby re-closing the valve.

Although not shown in FIG. 18-20 or 21A or 21B for reasons of clarity, each of the front and rear fluid-filled lens assemblies 601, 701 also includes a plurality of selectively operable actuators 680, 780 that are disposed around the membrane support ring 630, 730 in a manner similar to that described in Example 1 with reference to the lens assembly 200L. One actuator 680, 780 of each of the front and rear lens assemblies 601, 701 is shown in FIG. 24. As with the lens assembly 200L of Example 1, each actuator engages a tab 635, 735 that protrudes outwardly from the corresponding support ring 630, 730 and can be used for driving the tab 635, 735 and the adjoining region of the bendable support ring 630, 730 towards or away from the respective rear lens 610, 710 for controlling the profile of the membrane support ring 630, 730, and thus the profile of the edge of the corresponding membrane 620, 720, as described above in Example 1.

By injecting or withdrawing refractive fluid 665 from each of the front and rear lens assemblies 601, 701, and by controlling the profile of the boundary of the membrane 620, 720 of each assembly 601, 701 using the actuators 680, 780 to displace differentially local regions of each support ring 630, 730 towards or away from the corresponding rear lens 610, 710, the optical power of each of the front and rear lens assemblies 601, 701 can be adjusted while maintaining a spherical or nearly spherical form of the membrane 620, 720 despite its non-round shape.

Figure 25:
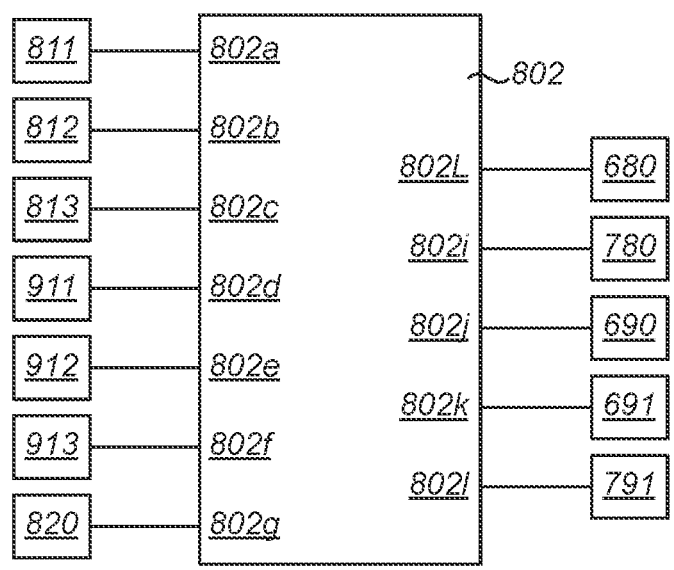
FIG. 25 is a schematic diagram of the electronic control system for the augmented reality display module of FIG. 24.

Each of the front and rear lens assemblies 601, 701 includes a pressure sensor 811, 911, a temperature sensor 812, 912 and at least one position sensor 813 913 for sensing the position and/or curvature of the corresponding membrane support ring 630, 730 relative to the respective rear lens 610, 710. As described above for Example 2, in some embodiments, one or both of the pressure and temperature sensors 811, 911 may be omitted. The temperature, pressure and position sensors 811, 911; 812, 912; 813, 913 are connected to corresponding terminals 802a, 802b . . . 802f of a microcontroller 802 as shown in FIGS. 24 and 25. An input device 820 for selecting desired optical powers of the front and rear lens assemblies 601, 701, as described below in more detail, is connected to a seventh terminal 802g. Meanwhile, the actuators 680, 780 on the front and rear lens assemblies 601, 701, the fluid injector 690 and the front and rear valves 691, 791 in the T-shaped connector 699 are connected to terminals 802h to 802l respectively.

In the present embodiment of this example, the rear surfaces 612, 712 of the hard rear lenses 610, 710 of the front and rear lens assemblies 601, 701 have different fixed optical powers. The rear surface 612 of the hard lens 610 of the front lens assembly 601 has an optical power of −0.5 dioptres, while the rear surface 712 of the hard lens 710 of the rear lens assembly 701 has an optical power of −3.0 dioptres. These optical powers may be varied in other embodiments of the invention as desired by those skilled in the art.

The optical power provided by the front surface of the membrane 620, 720 of each of the front and rear lens assemblies 601, 701 is adjustable in the range about 0.5 to 3.0 dioptres. Again, this range may be different in different embodiments of the invention, and in some embodiments the front and rear lens assemblies 601, 701 may be capable of different ranges of optical power. However, in the present embodiment, the composite optical power of the front lens assembly 601 is adjustable in the range 0-2.5 dioptres, while the composite optical power of the rear lens assembly 701 is adjustable in the range −2.5-0 dioptres.

In the present embodiment, the input device 820 is operable to output a signal that encodes a variable corresponding to a specific focal length. The input device 820 calculate the specific focal length from signals received from an eye-tracking system comprising one or more eye-tracking devices (not shown).

Suitably, the eye-tracking system of the augmented reality headset 6 of the invention includes at least one separate eye-tracking device associated with each display module 600L, 600R for measuring one or more physical parameters associated with the user's eyes from which the specific focal length, corresponding to the user's point of gaze, can be calculated.

Numerous eye-tracking systems and methods are known in the virtual/augmented reality art and need not be described in detail herein. Typically, the or each eye-tracking device will comprise a suitable eye-tracking camera.

In some embodiments, the eye-tracking system may be used to determine the vergence between the user's eyes, which corresponds to the distance to the user's point of gaze. The specific focal length encoded by the output from the input device 820 may therefore correspond directly to the vergence, as disclosed, for example, by WO 2014/199180 A1, the contents of which are incorporated herein by reference. In other embodiments, the output of the eye-tracking system may be used to determine the user's point of gaze and the input device 820 may determine the specific focal length from the calculated point of gaze. It will be appreciated that the specific focal length calculated by the input device 820 will vary dynamically as the user's gaze changes.

Based on the specific focal length inputted to the microcontroller 802 by the input device 820, the microcontroller 802 executes machine code stored in a memory device forming part of the microcontroller to adjust the optical power of the rear lens assembly 701 to the selected focal length. In this way, virtual images conveyed by light outputted from the waveguide display 900 are viewed by the user at the specific focal length to avoid vergence-accommodation conflict of the kind associated with augmented reality display devices.

The microcontroller 802 operates to adjust the optical power of the front lens assembly 601 to compensate for the optical power of the rear lens assembly 701, so that the net optical power of the front and rear lens assemblies 601, 701 is maintained at zero or another constant value according to the user's prescription. In this way, the user's view of the real world in front of the front lens assembly 601 is unaffected by the changes in the individual optical powers of the front and rear lens assemblies 601, 701.

Further, the microcontroller 802 operates, as described in relation to the lens assembly 200L of Example 1 above to minimise the thicknesses of the individual lens assembly 601, 701 for each optical power by maintaining a minimum clearance between the membrane 620, 720 of each lens assembly 601, 701 and the front face of the rear wall 616, 716 of the dish-shaped receptacle 615, 715 bonded to the front surface 611, 711 of the respective hard rear lens 610, 710. Refractive fluid 665 can be injected or withdrawn from each of the front and rear lens assemblies 601, 701 separately by operating the valves 691, 791.

Figure 26:
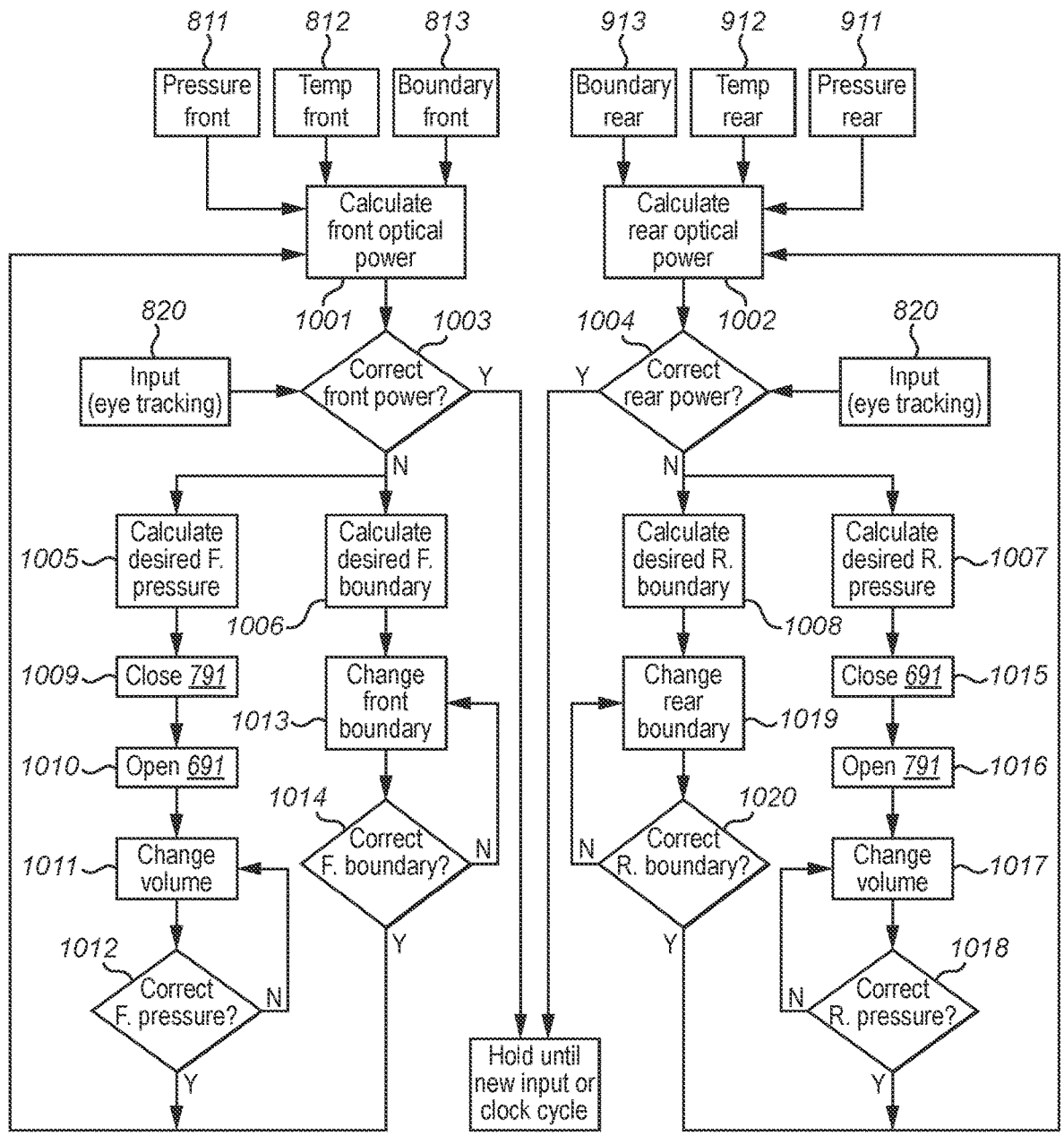
FIG. 26 is a flowchart showing the operation of the electronic control device of FIG. 25.

FIG. 26 is a flow diagram showing the operation of the microcontroller 802 of each of the lens modules 600L, 600R of the present embodiment. Thus, in steps 1001, 1002, the microcontroller 802 calculates the current optical powers of the front and rear lens assemblies 601, 701 respectively from the inputs from the associated pressure, temperature and position sensors 811, 812, 813; 911, 912, 913.

Based on the signal received from the input device 820, the microcontroller 802 in steps 1003 and 1004 determines whether the optical power of the front and rear lens assemblies 601, 701 respectively are correct, in that the optical power of the rear lens assembly 701 corresponds to the specific focal length represented by the output signal from the input device 820, and the optical power of the front lens assembly 601 is the conjugate of the optical power of the rear lens assembly 701 as described above. If the optical powers of the front and rear lens assemblies 601, 701 are correct, then no adjustments are made until the input from the input device 820 changes or until the next clock cycle of the microprocessor 802.

However, if the optical powers of the front and/or rear lens assemblies 601, 701 are incorrect in that they do not correspond to the specific focal length output by the input device 820, in steps 1005 and 1006 respectively, the microcontroller 802 calculates the required pressure in the cavity 650 and the required position of the membrane support ring 630 of the front lens assembly 601 to bring the optical power of the front lens assembly 601 to the required optical power by adjusting the volume of refractive fluid 665 in the cavity 650 and adjusting the profile of the support ring 630 using the actuators 680 to maintain a spherical or nearly spherical form of the membrane 620. As described above in relation to Example 1, this may be done using lookup tables. In steps 1007 and 1008 respectively, the microcontroller 802 calculates the required pressure within the cavity 750 of the rear lens assembly 701 and the required position of the membrane support ring 720 corresponding to the correct optical power for the rear lens assembly 701.

In step 1009, the valve 791 in the rear branch 798 of the T-shaped connector 699 is closed, and in step 1010, the front valve 691 in the front branch 698 is opened to allow adjustment of the volume of fluid in the cavity 650 of the front lens assembly 601 using the injector 690. In step 1011, the microcontroller 802 controls the motor 697 to operate the injector 690 to adjust the amount of refractive fluid 665 in the cavity 650. In step 1012, the pressure in the cavity 650 is measured and if it is still incorrect, step 1011 is repeated until the correct pressure is achieved.

In step 1013, the microcontroller 802 operates the one or more actuators 680 around the boundary of the front membrane 620 to bring the profile of the membrane support ring 630 to the correct shape to maintain a spherical or nearly spherical form of the membrane 620 at the selected specific focal length. In step 1014, the position and/or curvature of the membrane support ring 630 is checked using the sensor 813 and adjustment is continued until the correct boundary shape is achieved.

In the same way, in steps 1015 and 1016, the front valve 691 is closed and the rear valve 791 in the rear branch 798 of the T-shaped connector 699 is opened to allow adjustment of the volume of fluid 665 in the cavity 750 of the rear lens assembly 701 using the fluid injector 690. In step 1017, the volume of fluid in the rear cavity 750 is adjusted using the injector 690 and in step 1018, the fluid pressure in the rear cavity 750 is checked, with the volume of fluid being adjusted in step 1017 until the correct pressure is achieved. In step 1019, the actuators 780 around the membrane support ring 730 of the rear lens assembly 701 are adjusted to achieve the correct boundary profile for the membrane 720 to maintain a spherical or nearly spherical form of the membrane 720, and in step 1020, the position and/or curvature of the membrane support ring 730 of the rear lens assembly 701 is checked, with adjustment being continued until the correct position such curvature is achieved.

As mentioned above, for each of the front and rear lens assembly 601, 701, the volume of fluid 665 in the respective cavity 650, 750 is adjusted to achieve the minimum clearance between the membrane supporting ring 630, 730 and the front surface 611, 711 of the respective rear lens 610, 710, thereby to minimise the thickness of each of the lens assemblies 601, 701 at each optical power.

EXAMPLE 4: ROUND HYBRID INJECTION-COMPRESSION VARIABLE FOCAL POWER FLUID-FILLED LENS ASSEMBLY

Examples 1-3 above illustrate how a non-round hybrid injection-compression lens assembly can be operated to minimise the thickness of the lens assembly at all positive optical powers, thereby providing a technical advantage over known "compression only" type lens assemblies in which the minimum thickness of the lens assembly, which comprises a fixed volume of fluid, is limited by the maximum required positive optical power of the lens assembly and the corresponding requisite separation between a neutral circle of a distensible membrane forming one optical surface of the lens assembly and an interior surface of a hard fixed lens on which the membrane is mounted. However, the principles of the present invention also extend to round variable optical power fluid-filled lens assemblies and such lens assemblies in which a distensible membrane is controlled to form a concave surface providing negative optical power.

FIGS. 27, 28, 30A, 29A-29C, 30A and 30B illustrate a round hybrid injection-compression fluid-filled variable optical power lens assembly 1300 in accordance with the invention. Several parts of the round lens assembly 1300 of the present embodiment have similar counterparts in the lens assemblies 200L, 601 and 701 of the first, second and third examples described above and are indicated in the drawings using similar reference numerals, prefixed with the numbers "13" instead of "2", "3" "6" or "7" respectively. Similar materials and methods to those described in the first, second and third examples may be used for constructing the round lens assembly of the present embodiment and are not repeated here in detail.

The round lens assembly 1300 of the present embodiment comprises a fluid-filled envelope that is formed by an optically clear, rigid plate 1310 having a first surface 1311 and an opposite second surface 1312, a dish-shaped receptacle 1315 having a collapsible side wall 1317 which terminates remote from the rigid plate 1310 in a peripheral flange 1319 that is bonded to an annular membrane support ring 1330 and a circular, optically clear, distensible membrane 1320, which is stretched to a line tension of about 200 $Nm^{-1}$ and is held around its edge by the annular support ring 1330, and is filled with a refractive fluid 1365. In the present embodiment, since the membrane 1320 is round, there is no need to adjust the profile of the edge of the membrane 1320 as it distends to maintain a spherical form of the membrane 1320, and accordingly the support ring 1330 is rigid, unlike the preceding examples.

The optical power of the lens assembly 1300 is defined by the curvature of the membrane 1320 and the shape of the second surface 1312 of the rigid plate 1310. In the present embodiment, the second surface 1312 of the rigid plate 1310 is planar, so the optical power of the assembly 1300 is governed entirely by the curvature of the membrane 1320. However, in other embodiments, at least the second surface 1312 of the rigid plate 1310 may be curved to modify the optical properties of the assembly 1300. Thus, as described above, the second surface may be convex or concave. The first surface 1311 of the rigid plate 1310 is also planar in the present example, but similarly in other embodiments it may have a degree of curvature. Like the second surface 1312, the first surface 1311 may be convex or concave. The rigid plate 1310 may thus form a meniscus lens, which may be converging or diverging.

In the same way as the embodiments of Examples 1-3 above, the rigid plate 1310 of the present embodiment includes an injection port 1340 that communicates with the interior of the envelope through a corresponding aperture 1318 formed in the dish-shaped receptacle 1315. The injection port 1340 is attached to a fluid injector (not shown) by tube 1399. By using the injector, refractive fluid 1365 can be injected into or withdrawn from the interior of the envelope for inflating or deflating the membrane 1320 to adjust the optical power of the lens assembly 1300.

Figure 27:
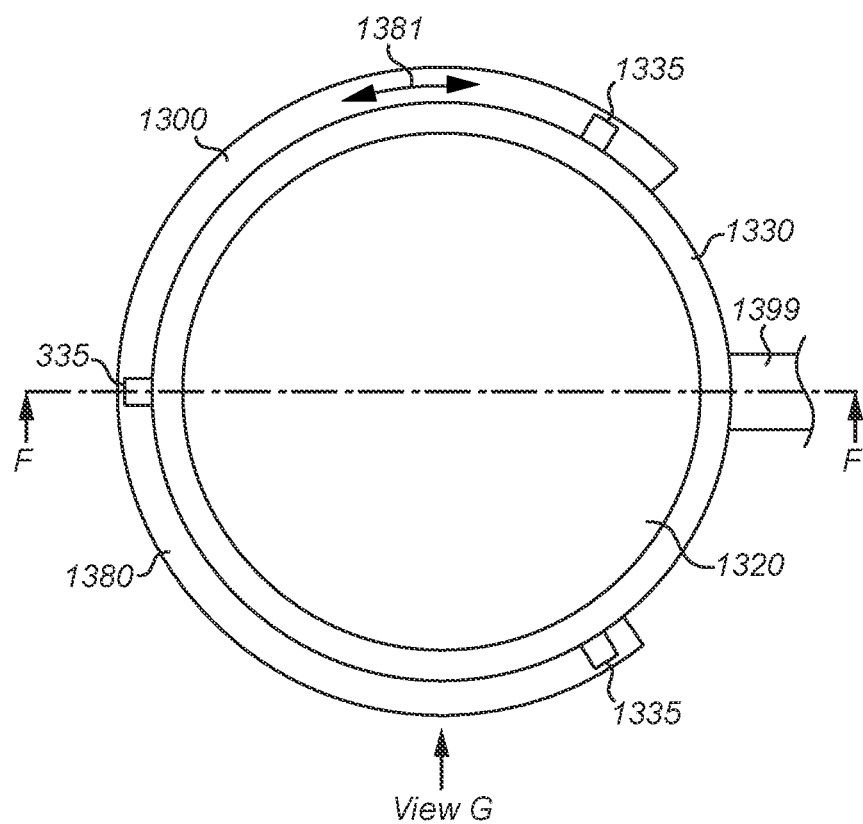
FIG. 27 is a front view of a circular hybrid injection-compression variable focal power fluid-filled lens element in accordance with the present invention.
Figure 28:
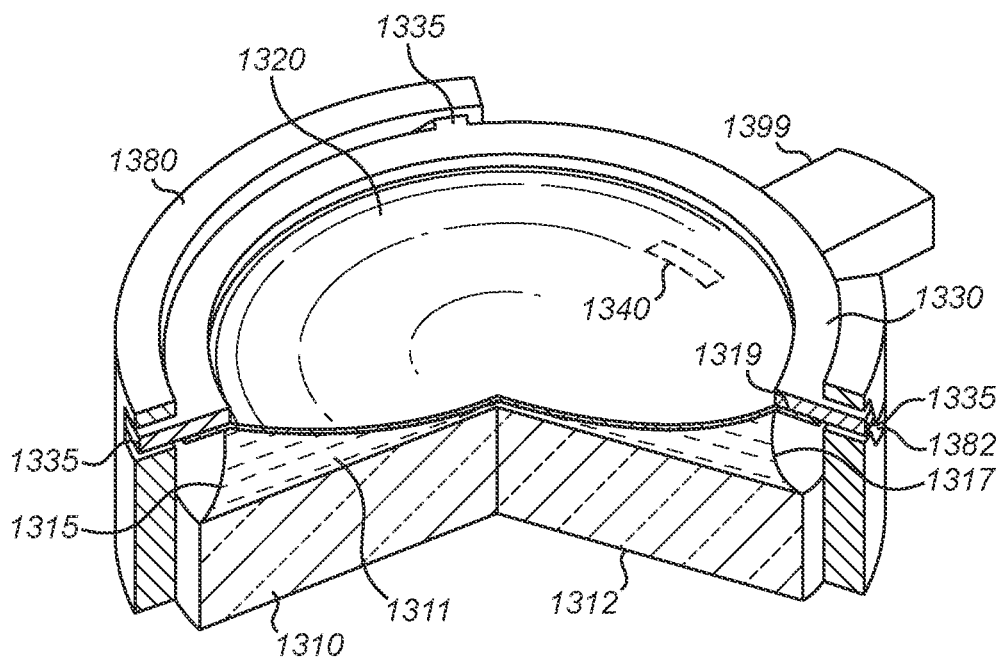
FIG. 28 is a perspective view, which is partly in cross-section, from the bottom and to one side of the front of the circular lens element of FIG. 27.

The membrane support ring 1330 is provided with a plurality of outwardly extending tabs 1335, each of which is received in a corresponding elevator slot 1382 formed in a cylindrical actuator ring 1380 that is mounted rotatably around the rear plate 1310 and support ring 1330. As best seen in FIG. 27, the actuator ring 1380 is mounted substantially coaxially with the support ring 1330. Rotation of the actuator ring 1380 as indicated by the double-headed arrow 1381 in FIG. 27 causes the support ring 1330 to move towards or away from the rigid plate 1310, according to the direction of rotation and the configuration of the elevator slot 1382, with the elevator slots 1382 serving as sliding cams for the protruding tabs 1335 on the support ring 1330. A mechanism (not shown) is provided to prevent rotation of the membrane support ring 1330 with the actuator ring 1380. Various suitable mechanisms for this purpose will be apparent to those skilled in the art.

Figure 29A:
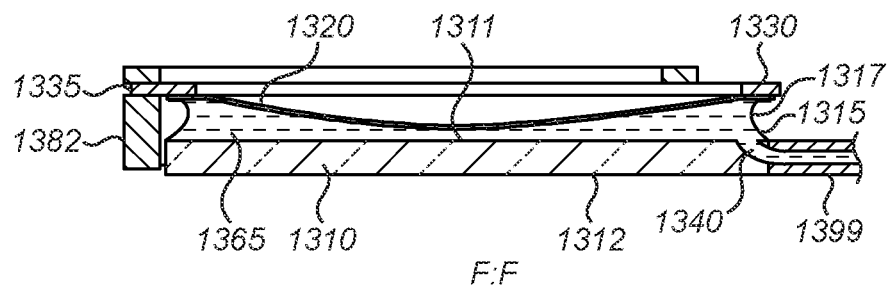
FIG. 29A shows the circular lens element of FIG. 27 in a maximal negative dioptre actuated state.
Figure 29B:
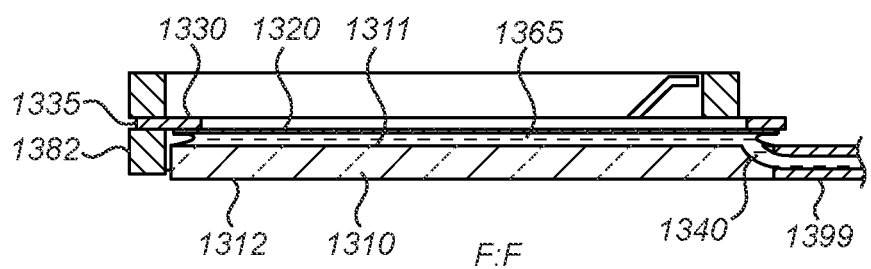
FIG. 29B shows the lens element in a neutral, non-actuated state.
Figure 29C:
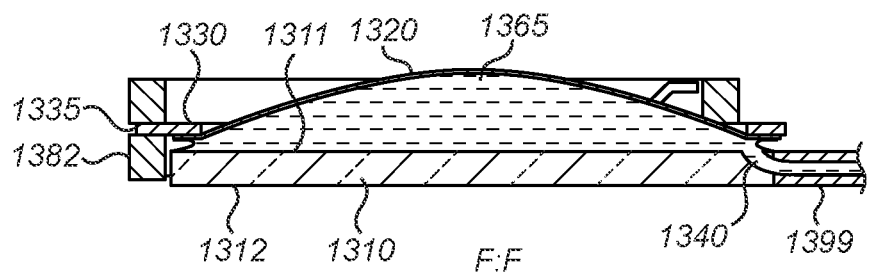
FIG. 29C shows the lens element in a maximal positive dioptre actuated state.

The hybrid injection-compression lens assembly 1300 of the present embodiment allows the membrane 1320 to be adjusted continuously from a flat, neutral state as shown in FIG. 29B to a convex distended state providing positive optical power as shown in FIG. 29C or a concave retracted (or "shrunk") state as shown in FIG. 29A.

Figure 30A:
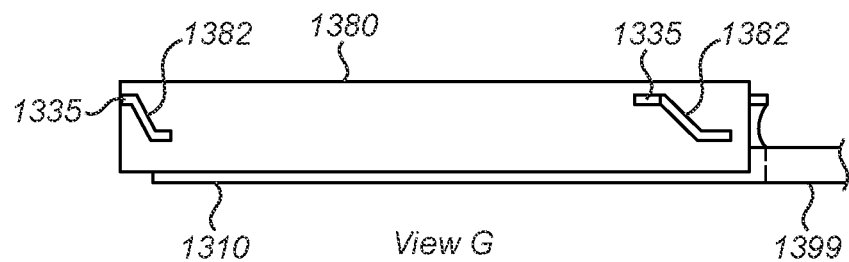
FIG. 30A is a bottom view of the circular lens element of FIG. 27 shown in the maximal negative dioptre actuated state corresponding to FIG. 29A.
Figure 30B:
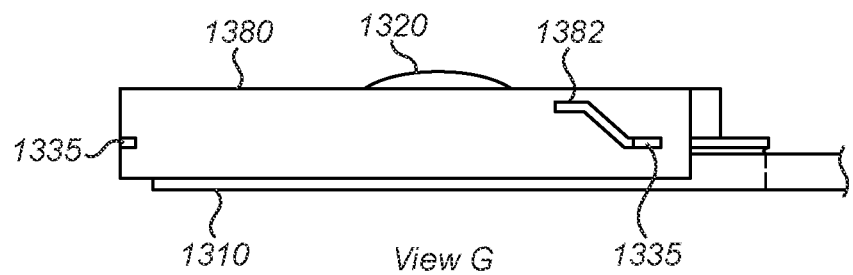
FIG. 30B shows the lens element in the maximum positive dioptre actuated state corresponding to FIG. 29C.

In the neutral state of FIG. 29B, the actuator ring 1380 is positioned such that the tabs 1335 on the support ring 1330 are disposed at ends of their respective elevator slots 1382 closest to the rear plate 1310 as shown in FIG. 30A, such that the support ring 1330 is disposed adjacent the rear plate 1310, with the sidewall 1317 of the dish-shaped receptacle 1315 in a collapsed state; there is minimal fluid 1365 within the envelope, and the membrane 1320 is substantially planar. In this way, the thickness of the lens assembly 1300 is minimised when the curvature of the membrane 1330 is minimal.

In order to increase the curvature of the membrane, additional fluid 1365 is injected into the envelope using the injector (not shown), thereby causing the membrane 1320 to progressively distend in a convex manner, as shown in FIG. 29C. The maximum curvature of the membrane 1320 is limited only by the material properties of the components of the assembly, the strength of the joints between them and the volume of fluid 1365 that is available for injection into the envelope.

To decrease the power of the assembly 1300, fluid 1365 is withdrawn from the envelope using the injector to deflate the membrane 1320 back to the state shown in FIG. 29B.

The assembly 1300 of the present embodiment is also capable of negative optical powers. By rotating the actuator ring 1380 relative to the support ring 1330 the support ring 1330 is caused to move away from the rigid plate 1310 as shown in FIGS. 29A and 30A, with the side wall 1317 of the receptacle 1315 extending from its collapsed state to allow this. For a given volume of fluid 1365 in the envelope, the membrane 1320 becomes progressively more concave as the support ring 1330 moves further from the rigid plate 1310. The maximum negative curvature of the membrane 1320 is limited by the maximum displacement of the actuator ring 1380 relative to the rigid plate 1310 and the requirement for at least minimal clearance between the membrane 1320 and the first surface 1311 of the plate 1310. If additional fluid 1365 is required to allow the support ring 1330 to move further from the plate 1310 to its maximum extent, this can be provided by injecting more fluid 1365 into the envelope.

It will be appreciated that the arrangement of the present embodiment offers significant advantages over known "injection-only" type fluid-filled lens assemblies, in that the assembly 1300 of the present embodiment is capable of providing both positive and negative membrane curvature, while minimising its thickness for all configurations of the membrane. An injection-only type lens that is capable of negative (concave) membrane curvature requires a minimum spacing between the edge of the membrane and rigid plate to ensure a clearance between the membrane, typically the optical centre of the membrane, and the rigid plate even at maximum (negative) curvature. The greater the desired (negative) optical power of the lens, the greater the spacing between the edge of the membrane and the rigid plate must be. In an injection-only lens, this minimum spacing is also present when the membrane is not distended or when it is positively distended in a convex manner. Advantageously, in accordance with the hybrid injection-compression lens assembly of the present invention, this minimum spacing is only needed when the membrane is concave. When the curvature of the membrane is made less negative, or is positive, or when the membrane is flat, the spacing between the membrane edge and the rigid plate 1310 can be reduced by moving the membrane support ring 1330 towards the rigid plate 1310, thereby minimising the thickness of the lens assembly 1300.

In the lens assembly 1300 of the present embodiment, the membrane 1320, refractive fluid 1365 and rigid plate 1310 are optically clear, such that the assembly forms a variable optical power lens. In a variant, the membrane 1320 may be mirrored on its outer surface to form a variable optical power mirror. In such case, the fluid and/or rigid plate 1310 may be opaque.

The invention claimed is:

1. An adjustable focal power optical device comprising a hybrid injection-compression variable focal power optical element and an electronic control system, the optical element comprising:
   a fluid-filled envelope having a rigid first wall, a second wall opposite the first wall which comprises a distensible membrane held under tension around its edge by a peripheral support ring, and a collapsible side wall extending between the first and second walls, the first and second walls being coupled together in such a manner as to permit movement of the peripheral support ring towards or away from the first wall, the envelope being filled with a substantially incompressible fluid;
   a port for introducing more or withdrawing some of the substantially incompressible fluid into or from the envelope;
   at least one spacing control device for controlling the spacing between the peripheral support ring or one or more regions thereof and the first wall, the spacing being controllable between a minimum spacing and a maximum spacing; and
   an electronically operable injector for introducing or withdrawing fluid from the envelope via the port;
   whereby the electronic control system is configured to receive a selected focal power from an input device and, in response to receipt of the selected focal power, to adjust the focal power of the optical element to the selected focal power;
   wherein the focal power of the optical element is adjustable between a maximum focal power and a minimum focal power, an intermediate focal power being between the maximum focal power and the minimum focal power;
   wherein when the focal power of the optical element is in a range between the minimum focal power and the intermediate focal power, the electronic control system is configured to adjust the focal power by changing the spacing between the support ring or the one or more regions thereof and the first wall using the at least one spacing control device;
   wherein when the focal power of the optical element is in a range between the maximum focal power and the intermediate focal power, the electronic control system is configured to adjust the focal power by changing the volume of the fluid in the envelope using the electronically operable injector whilst the spacing between the support ring or the one or more regions thereof and the first wall is maintained at the minimum spacing.

2. The adjustable focal power optical device as claimed in claim 1, wherein the membrane is circular.

3. The adjustable focal power optical device as claimed in claim 1, wherein the peripheral support ring is rigid.

4. The adjustable focal power optical device as claimed in claim 1, wherein the membrane is non-circular and the peripheral support ring is resiliently bendable.

5. The adjustable focal power optical device as claimed in claim 4, wherein each spacing control device comprises an actuator that is arranged to act on the support ring at one or more control points on one or more corresponding regions of the support ring for moving the one or more regions of the support ring towards or away from the first wall.

6. The adjustable focal power optical device as claimed in claim 5, which comprises a plurality of actuators arranged to act on the support ring at a plurality of control points that are spaced apart on the support ring for moving corresponding regions of the support ring towards or away from the first wall.

7. The adjustable focal power optical device as claimed in claim 6, wherein each actuator is selected independently from a sliding cam actuator, a rotating cam actuator, a piston, an SMA actuator or a piezo actuator.

8. The adjustable focal power optical device as claimed in claim 1, wherein the port is formed in the first wall at a location adjacent the side wall.

9. The adjustable focal power optical device as claimed in claim 1, wherein the injector comprises a reservoir for holding an amount of the fluid outside the envelope and a pump for moving fluid between the envelope and the reservoir via the port.

10. The adjustable focal power optical device as claimed in claim 9, wherein the pump comprises a positive displacement pump.

11. The adjustable focal power optical device as claimed in claim 1, wherein the distensible membrane is optically clear, the first wall is formed by an optically clear rigid component having an optical outer surface, or by a layer of optically-clear material supported on an inner surface thereof, and the fluid is a refractive fluid.

12. The adjustable focal power optical device as claimed in claim 1, further comprising one or more sensors for directly or indirectly sensing one or more of the volume of fluid in the envelope, the temperature and/or pressure of the fluid, the position of the support ring, or one or more regions thereof, or the curvature of one or more regions of the support ring.

13. The adjustable focal power optical device as claimed in claim 1, wherein the electronic control system is operable to reduce, for any given distension of the membrane, the spacing between (i) the support ring and/or the distensible membrane and (ii) the first wall.

14. The adjustable focal power optical device as claimed in claim 1, wherein the electronic control system comprises a processor, a memory and a plurality of sensors for directly or indirectly sensing one or more of the volume of fluid in the envelope, the temperature and/or pressure of the fluid and the spacing of the support ring or one or more regions thereof from the first wall or the curvature of one or more regions of the support ring.

15. The adjustable focal power optical device as claimed in claim 14, wherein the processor is operable to receive an input signal representing or corresponding to a specific focal length and to execute machine code stored in the memory to operate the at least one spacing control device and injector to control the shape of the distensible membrane to the specific focal length based on sensor data received from one or more of the plurality of sensors.

16. The adjustable focal power optical device as claimed in claim 15, wherein the sensor data includes the temperature and pressure of the fluid in the envelope and the spacing of the support ring or one or more regions thereof from the first wall or the curvature of one or more regions of the support ring.

17. The adjustable focal power optical device as claimed in claim 16, wherein the sensor data further includes the volume of fluid in the envelope.

18. An article of eyewear comprising at least one variable focal power optical device as claimed in claim 1, wherein the article of eyewear is an augmented reality device.

19. The article of eyewear as claimed in claim 18, further comprising an eye-tracking system associated with the variable focal power optical device, the electronic control system being operable to receive a signal from the eye-tracking system that encodes an eye-position variable corresponding to a specific focal power and adjust the focal power of the variable focal power optical element to that specific focal power.

20. An adjustable focal power optical device according to claim 1,
wherein when the optical element is configured to provide the minimum focal power, the distensible membrane has a minimum clearance from the first wall at the optical center of the optical element;
wherein when the focal power is in the range between the minimum focal power and the intermediate focal power, the electronic control system is configured to adjust the focal power of the optical element by changing both: (i) the spacing between the support ring or the one or more regions thereof and first wall using the at least one spacing control device, and (ii) the volume of the fluid in the envelope using the electronically operable injector, the adjustment being such that, at the optical center of the lens, the distensible membrane is maintained at the minimum clearance from the first wall.

21. An adjustable focal power optical device according to claim 20, wherein when the optical element is at the intermediate focal power, the spacing between the support ring or the one or more regions thereof and the first wall is at the minimum spacing, and the distensible membrane has the minimum clearance from the first wall at the optical center of the optical element.

22. An augmented reality headset comprising at least one group of optical elements in optical alignment with one another, each group including at least two variable focal power optical elements with a waveguide interposed therebetween for displaying a virtual image;
wherein at least one of the variable focal power optical elements is a hybrid injection-compression variable focal power optical element comprising a fluid-filled envelope having a first wall which is formed or supported by an inner surface of an optically clear hard lens, a second wall opposite the first wall which is formed by an optically clear distensible membrane held under tension around its edge by a peripheral support ring, and a collapsible side wall between the first and second walls, the peripheral support ring and hard lens being coupled together in such a manner as to permit movement of the peripheral support ring towards or away from the first wall, and the envelope being filled with a substantially incompressible refractive fluid; at least one port for introducing more or withdrawing some of the substantially incompressible refractive fluid into or from the envelope; and one or more spacing control devices for actively controlling the spacing between the peripheral support ring, or one or more regions thereof, and the first wall, the spacing being controllable between a minimum spacing and a maximum spacing;
at least one electronically operable injector for introducing or withdrawing fluid into or from the envelopes of the at least one hybrid injection-compression variable focal power optical element of the group of optical elements via the port; and
an electronic control system for operating the spacing control device of the at least one hybrid injection-compression variable focal power optical element of the group and the electronically operable injector to control the shape of the distensible membrane of the at least one hybrid injection-compression variable focal power optical element;
whereby the electronic control system is configured to adjust, in response to an input from an input device, the focal power of the at least one hybrid injection-compression variable focal power optical element within the group when the virtual image is displayed during use of the augmented reality headset by controlling both: (i) the spacing between its support ring or the one or more regions thereof and the first wall and (ii) the volume of the fluid in the envelope;
wherein when the focal power of the at least one hybrid injection-compression variable focal power optical element is in a first range of focal powers, the electronic control system is configured to adjust the focal power by changing the spacing between the support ring or the one or more regions thereof and the first wall using the at least one spacing control device;
wherein when the focal power of the at least one hybrid injection-compression variable focal power optical element is in a second range of focal powers, which is higher than the first range of focal powers, the electronic control system is configured to adjust the focal power by changing the volume of the fluid in the envelope using the electronically operable injector whilst the spacing between the support ring, or one or more regions thereof, and the first wall is maintained at the minimum spacing.

23. The augmented reality headset of claim 22, wherein each of at least two of the variable focal power optical elements are hybrid injection-compression variable focal power optical elements comprising a fluid-filled envelope having a first wall which is formed or supported by an inner surface of an optically clear hard lens, a second wall opposite the first wall which is formed by an optically clear distensible membrane held under tension around its edge by a peripheral support ring, and a collapsible side wall between the first and second walls, the peripheral support ring and hard lens being coupled together in such a manner as to permit movement of the peripheral support ring towards or away from the first wall, and the envelope being filled with a substantially incompressible refractive fluid; at least one port for introducing more or withdrawing some of the substantially incompressible refractive fluid into or from the envelope; and one or more spacing control devices for actively controlling the spacing between the peripheral support ring, or one or more regions thereof, and the first wall.

24. An adjustable focal power optical device comprising a hybrid injection-compression variable focal power optical element and an electronic control system, the optical element comprising:
a fluid-filled envelope having a rigid first wall, a second wall opposite the first wall which comprises a distensible membrane held under tension around its edge by a peripheral support ring, and a collapsible side wall extending between the first and second walls, the first and second walls being coupled together in such a manner as to permit movement of the peripheral support ring towards or away from the first wall, the envelope being filled with a substantially incompressible fluid;

a port for introducing more or withdrawing some of the substantially incompressible fluid into or from the envelope;

at least one spacing control device for controlling the spacing between the peripheral support ring or one or more regions thereof and the first wall; and an electronically operable injector for introducing or withdrawing fluid from the envelope via the port;

whereby the electronic control system is configured to adjust the focal power of the optical element to a selected focal power by:

reducing the dioptric value of the optical element by (i) increasing the spacing between the support ring or the one or more regions thereof and first wall using the at least one spacing control device, and (ii) introducing fluid to the envelope using the electronically operable injector; and/or increasing the dioptric value of the optical element by (i) reducing the spacing between the support ring or the one or more regions thereof and first wall using the at least one spacing control device, and (ii) withdrawing fluid from the envelope using the electronically operable injector.

25. An adjustable focal power optical device according to claim 24, wherein the selected focal power is one of a plurality of different focal powers which can be selected, wherein the electronic control system is configured to control the at least one spacing control device and the electronically operable injector such that, at an optical center of the optical element, a clearance between the distensible membrane and the first wall is the same for each of the plurality of different focal powers which can be selected.

* * * * *